United States Patent
Mas-Ud Hussain et al.

(10) Patent No.: US 10,274,329 B2
(45) Date of Patent: Apr. 30, 2019

(54) METHOD AND APPARATUS FOR PROVIDING A MINIMUM OVERLAPPING ALTERNATIVE PATH

(71) Applicant: HERE Global B.V., Eindhoven (NL)

(72) Inventors: Muhammed Mas-Ud Hussain, Chicago, IL (US); Bo Xu, Lisle, IL (US)

(73) Assignee: HERE Global B.V., Eindhoven (NL)

( * ) Notice: Subject to any disclaimer, the term of this patent is extended or adjusted under 35 U.S.C. 154(b) by 176 days.

(21) Appl. No.: 15/478,971

(22) Filed: Apr. 4, 2017

(65) Prior Publication Data

US 2018/0283886 A1  Oct. 4, 2018

(51) Int. Cl.
*G01C 21/34* (2006.01)
*G01C 21/36* (2006.01)
*H04L 29/08* (2006.01)

(52) U.S. Cl.
CPC ..... *G01C 21/3446* (2013.01); *G01C 21/3415* (2013.01); *G01C 21/3461* (2013.01); *G01C 21/3469* (2013.01); *G01C 21/3476* (2013.01); *G01C 21/3492* (2013.01); *G01C 21/3614* (2013.01); *G01C 21/3676* (2013.01);
(Continued)

(58) Field of Classification Search
CPC .................................................. G01C 21/3446
See application file for complete search history.

(56) References Cited

U.S. PATENT DOCUMENTS

| | | | | |
|---|---|---|---|---|
| 6,256,295 B1 * | 7/2001 | Callon | ................ | H04L 49/3081 370/254 |
| 8,249,810 B2 * | 8/2012 | Jones | ................ | G01C 21/3446 701/400 |

(Continued)

FOREIGN PATENT DOCUMENTS

WO  2016/062732 A1  4/2016

OTHER PUBLICATIONS

Paraskevopoulos et al., "Improved Alternative Route Planning", 13th Workshop on Algorithmic Approaches for Transportation Modelling, Optimization, and Systems, 2013, pp. 1-14.
(Continued)

*Primary Examiner* — Hussein Elchanti
*Assistant Examiner* — Michael A Berns
(74) *Attorney, Agent, or Firm* — Ditthavong & Steiner, P.C.

(57) ABSTRACT

An approach is provided for generating a minimum overlapping alternative path. The approach involves receiving a constraint parameter for traversing a path between a first location and a second location. The approach also involves determining a critical portion of the path that is to be traveled to satisfy the constraint parameter, and designating a remaining portion of the path that is not the critical portion as a non-critical portion. The approach further involves calculating one or more candidate minimum overlapping alternative paths for the non-critical portion of the path. The approach further involves generating the minimum overlapping alternative path between the first location and the second location by combining the critical portion of the path with a selected one of the one or more candidate minimum overlapping alternative paths that satisfies the constraint parameter.

20 Claims, 16 Drawing Sheets

(52) U.S. Cl.
CPC ..... *G01C 21/3682* (2013.01); *G01C 21/3694* (2013.01); *H04L 67/12* (2013.01)

(56) References Cited

U.S. PATENT DOCUMENTS

| | | | |
|---|---|---|---|
| 8,660,789 B2* | 2/2014 | Demiryurek ....... | G01C 21/3492 |
| | | | 701/414 |
| 2010/0036606 A1* | 2/2010 | Jones ................. | G01C 21/3446 |
| | | | 701/533 |

OTHER PUBLICATIONS

Jeong et al., "Dissimilar Alternative Path Search Algorithm Using a Candidate Path Set", Apr. 26, 2011, pp. 409-425.

Career Cup, "Facebook Interview Question for Software Engineer / Developers", 2012, retrieved on Feb. 14, 2017 from https://www.careercup.com/question?id=13364661, 5 Pages.

Guattery et al., "A Contraction Procedure for Planar Directed Graphs", Proceedings of SPAA '92 of the Fourth Annual ACM Symposium on Parallel Algorithms and Architectures, 1992, 11 Pages.

Chondrogiannis et al., "Alternative Routing: k-Shortest Paths with Limited Overlap", Proceedings of SIGSPATIAL 15 of the 23rd SIGSPATIAL International Conference on Advances in Geographic Information Systems, Article No. 68, Nov. 3-6, 2015, 4 Pages.

\* cited by examiner

METHOD AND APPARATUS FOR PROVIDING A MINIMUM OVERLAPPING ALTERNATIVE PATH

BACKGROUND

Navigation and routing service providers are continually challenged to provide new and compelling services. One area of development relates to creating more personalized or customizable routing options. For example, typically when a traveler requests a navigation or routing service, a path that satisfies certain cost preferences or constraint parameters (e.g., shortest distance, shortest travel time, etc.) is returned. However, in some cases, the traditionally calculated path may not meet the traveler's needs or preferences. The user of the navigation service or system may then want an alternative path that is different from an originally planned path and yet meets the originally specified cost preference or constraint parameter. Depending on the complexity of the path, computing such an alternative path can require significant computational resources. Accordingly, service providers face significant technical challenges to enabling the computation of such alternative paths using minimal computational resources.

SOME EXAMPLE EMBODIMENTS

Therefore, there is a need for an approach for efficiently determining an alternative path in a navigation or mapping system.

According to one embodiment, a method comprises receiving a constraint parameter for traversing a path between a first location and a second location. The method also comprises determining a critical portion of the path. The critical portion is a portion of the path that are to be traveled to satisfy the constraint parameter. The method further comprises designating a remaining portion of the path that is not the critical portion as a non-critical portion. The method further comprises calculating one or more candidate minimum overlapping alternative paths for the non-critical portion of the path. The method further comprises generating the minimum overlapping alternative path between the first location and the second location by combining the critical portion of the path with a selected one of the one or more candidate minimum overlapping alternative paths that satisfies the constraint parameter.

According to another embodiment, an apparatus comprises at least one processor, and at least one memory including computer program code for one or more computer programs, the at least one memory and the computer program code configured to, with the at least one processor, cause, at least in part, the apparatus to receive a constraint parameter for traversing a path between a first location and a second location. The apparatus is also caused to determine a critical portion of the path. The critical portion is a portion of the path that are to be traveled to satisfy the constraint parameter. The apparatus is also caused to designate a remaining portion of the path that is not the critical portion as a non-critical portion. The apparatus is further caused to calculate one or more candidate minimum overlapping alternative paths for the non-critical portion of the path. The apparatus is further caused to generate the minimum overlapping alternative path between the first location and the second location by combining the critical portion of the path with a selected one of the one or more candidate minimum overlapping alternative paths that satisfies the constraint parameter.

According to another embodiment, a non-transitory computer-readable storage medium, carries one or more sequences of one or more instructions which, when executed by one or more processors, cause, at least in part, an apparatus to receive a constraint parameter for traversing a path between a first location and a second location. The apparatus is also caused to determine a critical portion of the path. The critical portion is a portion of the path that are to be traveled to satisfy the constraint parameter. The apparatus is also caused to designate a remaining portion of the path that is not the critical portion as a non-critical portion. The apparatus is further caused to calculate one or more candidate minimum overlapping alternative paths for the non-critical portion of the path. The apparatus is further caused to generate the minimum overlapping alternative path between the first location and the second location by combining the critical portion of the path with a selected one of the one or more candidate minimum overlapping alternative paths that satisfies the constraint parameter.

According to another embodiment, an apparatus comprises means for receiving a constraint parameter for traversing a path between a first location and a second location. The apparatus also comprises means for determining a critical portion of the path. The critical portion is a portion of the path that are to be traveled to satisfy the constraint parameter. The apparatus further comprises means for designating a remaining portion of the path that is not the critical portion as a non-critical portion. The apparatus further comprises means for calculating one or more candidate minimum overlapping alternative paths for the non-critical portion of the path. The apparatus further comprises means for generating the minimum overlapping alternative path between the first location and the second location by combining the critical portion of the path with a selected one of the one or more candidate minimum overlapping alternative paths that satisfies the constraint parameter.

According to one embodiment, a method comprises determining a set of nodes and links of a geographic database that delineate a path between a first location and a second location. The method also comprises identifying one or more critical links of the path. The one or more critical links are to be traveled between the first location and the second location to satisfy a constraint parameter. The method further comprises identifying the links of the set that are not the one or more critical links as non-critical links. The method further comprises calculating a minimum overlapping alternative path that includes the one or more critical links, minimizes a number of the non-critical links that overlap between the minimum overlapping alternative path and the path, and satisfies the constraint parameter.

According to another embodiment, an apparatus comprises at least one processor, and at least one memory including computer program code for one or more computer programs, the at least one memory and the computer program code configured to, with the at least one processor, cause, at least in part, the apparatus to determine a set of nodes and links of a geographic database that delineate a path between a first location and a second location. The apparatus is also caused to identify one or more critical links of the path. The one or more critical links are to be traveled between the first location and the second location to satisfy a constraint parameter. The apparatus is further caused to identify the links of the set that are not the one or more critical links as non-critical links. The apparatus is further caused to calculate a minimum overlapping alternative path that includes the one or more critical links, minimizes a number of the non-critical links that overlap between the minimum overlapping alternative path and the path, and satisfies the constraint parameter.

According to another embodiment, a non-transitory computer-readable storage medium carries one or more sequences of one or more instructions which, when executed by one or more processors, cause, at least in part, an apparatus to determine a set of nodes and links of a geographic database that delineate a path between a first location and a second location. The apparatus is also caused to identify one or more critical links of the path. The one or more critical links are to be traveled between the first location and the second location to satisfy a constraint parameter. The apparatus is further caused to identify the links of the set that are not the one or more critical links as non-critical links. The apparatus is further caused to calculate a minimum overlapping alternative path that includes the one or more critical links, minimizes a number of the non-critical links that overlap between the minimum overlapping alternative path and the path, and satisfies the constraint parameter.

According to another embodiment, an apparatus comprises means for determining a set of nodes and links of a geographic database that delineate a path between a first location and a second location. The apparatus also comprises means for identifying one or more critical links of the path. The one or more critical links are to be traveled between the first location and the second location to satisfy a constraint parameter. The apparatus further comprises means for identifying the links of the set that are not the one or more critical links as non-critical links. The apparatus further comprises means for calculating a minimum overlapping alternative path that includes the one or more critical links, minimizes a number of the non-critical links that overlap between the minimum overlapping alternative path and the path, and satisfies the constraint parameter.

According to another embodiment, a method comprises presenting a user interface of the navigation or mapping system. The user interface includes a first element for entering information for a path between a first location and a second location, a second element for entering a constraint parameter for the path, and a third element for presenting the minimum overlapping alternative path. The method also comprises querying a geographic database for a set of nodes and links that delineate the path between a first location and a second location in response to a user interaction for entering the information for the path and the constraint parameter via the user interface. The method further comprises identifying one or more critical links of the path. The one or more critical links are to be traveled between the first location and the second location to satisfy a constraint parameter. The method further comprises identifying the links of the set that are not the one or more critical links as non-critical links. The method further comprises calculating the minimum overlapping alternative path that includes the one or more critical links, minimizes a number of the non-critical links that overlap between the minimum overlapping alternative path and the path, and satisfies the constraint parameter. The method further comprises presenting the minimum overlapping alternative path in the user interface.

According to another embodiment, an apparatus comprises at least one processor, and at least one memory including computer program code for one or more computer programs, the at least one memory and the computer program code configured to, with the at least one processor, cause, at least in part, the apparatus to present a user interface of the navigation or mapping system, wherein the user interface includes a first element for entering information for a path between a first location and a second location, a second element for entering a constraint parameter for the path, and a third element for presenting the minimum overlapping alternative path. The apparatus is also caused to query a geographic database for a set of nodes and links that delineate the path between a first location and a second location in response to a user interaction for entering the information for the path and the constraint parameter via the user interface. The apparatus is further caused to identify one or more critical links of the path. The one or more critical links are to be traveled between the first location and the second location to satisfy a constraint parameter. The apparatus is further caused to identify the links of the set that are not the one or more critical links as non-critical links. The apparatus is further caused to calculate the minimum overlapping alternative path that includes the one or more critical links, minimizes a number of the non-critical links that overlap between the minimum overlapping alternative path and the path, and satisfies the constraint parameter. The method is further caused to present the minimum overlapping alternative path in the user interface.

According to another embodiment, a non-transitory computer-readable storage medium for adaptive location sampling in a mobile device, carries one or more sequences of one or more instructions which, when executed by one or more processors, cause, at least in part, an apparatus to present a user interface of the navigation or mapping system, wherein the user interface includes a first element for entering information for a path between a first location and a second location, a second element for entering a constraint parameter for the path, and a third element for presenting the minimum overlapping alternative path. The apparatus is also caused to query a geographic database for a set of nodes and links that delineate the path between a first location and a second location in response to a user interaction for entering the path and the constraint parameter via the user interface. The apparatus is further caused to identify one or more critical links of the path. The one or more critical links are to be traveled between the first location and the second location to satisfy a constraint parameter. The apparatus is further caused to identify the links of the set that are not the one or more critical links as non-critical links. The apparatus is further caused to calculate the minimum overlapping alternative path that includes the one or more critical links, minimizes a number of the non-critical links that overlap between the minimum overlapping alternative path and the path, and satisfies the constraint parameter. The method is further caused to present the minimum overlapping alternative path in the user interface.

According to another embodiment, an apparatus comprises means for presenting a user interface of the navigation or mapping system. The user interface includes a first element for entering information for a path between a first location and a second location, a second element for entering a constraint parameter for the path, and a third element for presenting the minimum overlapping alternative path. The apparatus also comprises means for querying a geographic database for a set of nodes and links that delineate the path between a first location and a second location in response to a user interaction for entering the path and the constraint parameter via the user interface. The apparatus further comprises means for identifying one or more critical links of the path. The one or more critical links are to be traveled between the first location and the second location to satisfy a constraint parameter. The apparatus further comprises means for identifying the links of the set that are not the one or more critical links as non-critical links. The apparatus further comprises means for calculating the minimum overlapping alternative path that includes the one or more critical links, minimizes a number of the non-critical links that overlap between the minimum overlapping alternative path and the path, and satisfies the constraint parameter. The apparatus further comprises means for presenting the minimum overlapping alternative path in the user interface.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Figure 1A:
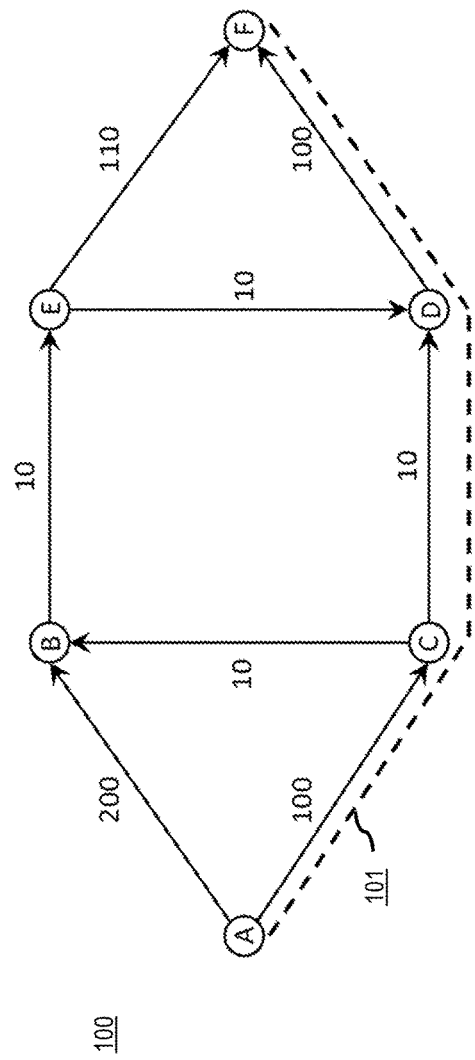
FIGS. 1A and 1B are diagrams illustrating a minimum overlapping alternative path with respect to a graph representing a transportation network, according to one embodiment.

Examples of a method, apparatus, and computer program for providing a minimum overlapping alternative path are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As discussed above, in a traditional navigation or mapping system, when a traveler requests a navigation or routing service, a path that satisfies certain cost preferences (typically shortest distance or travel-time) generally is returned.

However, in some cases, the traveler or other user of the service wants an alternative path that has minimum overlap with the originally planned path yet meets a cost constraint.

For example, when an accident occurs on the original path calculated by a navigation or mapping system, the traveler's navigation device is usually alerted with this information and triggers a re-routing. However, since the traffic jam caused by the accident can be dynamically propagating, and therefore, its exact impact area is unknown, the traveler may want the system to recalculate a path that has minimum overlap with the original path (so as to avoid the traffic jam) and yet reaches the destination within a cost preference or constraint parameter (e.g., a time requirement, such as reaching the destination within 1 hour).

For another example, consider two-way routing for delivery services (e.g., commercial delivery services such as Fedex, UPS, etc.). For the return path, it may be desirable that a delivery truck follows a path that has minimum overlap with the outbound path yet meets a time constraint. In this way, the delivery truck maintains a maximum delivery area while also maintain a delivery schedule (e.g., as specified by the time constraint or other constraint parameter). For example, as an alternative to time, the delivery truck may want a return trip that consumes no more than 50% of its available fuel. This fuel constraint can then be applied as the constraint parameter for determining a return trip. Delivery services are herein by way of illustration and not limitation. In other words, minimum overlapping routes in two-way or multi-way routing can be applied in any number of use cases. For example, a tourist may want to minimize repetition among paths so that as many attractions can be visited; a military patrolling vehicle needs to minimize repetition among paths so that as many places can be monitored; etc.

In one embodiment, the problem of calculating a minimum overlapping alternative path (hereinafter "MOAP") is discussed below with respect to a transportation network represented as a graph comprising nodes and links of a geographic database (e.g., a geographic database of FIG. 4). However, it is noted that the embodiments herein need not rely on a geographic database of nodes and links, but can be applied to any type of electronically stored representation of a transportation network. With respect to nodes and links, for example, each node (e.g., nodes A-F) within the graph of the transportation network represents a location point (e.g., latitude and longitude coordinates), and each link represents a road or travel segment between the nodes. The nodes and links are defined according to the geospatial arrangement of the transportation or road network that they represent.

In one embodiment, the transportation network graph can be defined as a directed graph G=<V,E> where V is the set of nodes and E is the set of links in the graph. Under this system, given a path P=<$node_1$, $node_2$, . . . , $node_n$> where n≥2 and a constraint parameter (e.g., a time-constraint δ), a constrained (e.g., time constrained) Minimum Overlapping Alternative Path of P, denoted MOAP (P, δ), is a path P'=<$node'_1$, $node'_2$, . . . , $node'_n$>, where the total travel time of P' is ≤δ and the number of common links between P and P' is minimum among all paths with travel time≤δ. It is noted that although the various embodiments described herein discuss a constraint parameter in terms of travel time and the overlap is in terms of number of links, the embodiments also are applicable to other constraint parameters (e.g., distance, fuel consumption, safety, etc.) and other overlap criteria (e.g., overlapping length). In one embodiment, the constraint parameters are used to determine which candidate alternative paths satisfy a cost preference consideration as a possible MOAP, while the overlap criteria are used to determine the degree to which P (e.g., an original or reference path) and P' (e.g., an alternative path) overlap. As a result, the constraint parameter and the overlap criteria are orthogonal with respect to each other, and can operate or be selected independently of each other to determine a MOAP of P. It also is noted that there may be none or more than one MOAP for a given path and a given constraint parameter (e.g., time constraint).

Figure 1B:
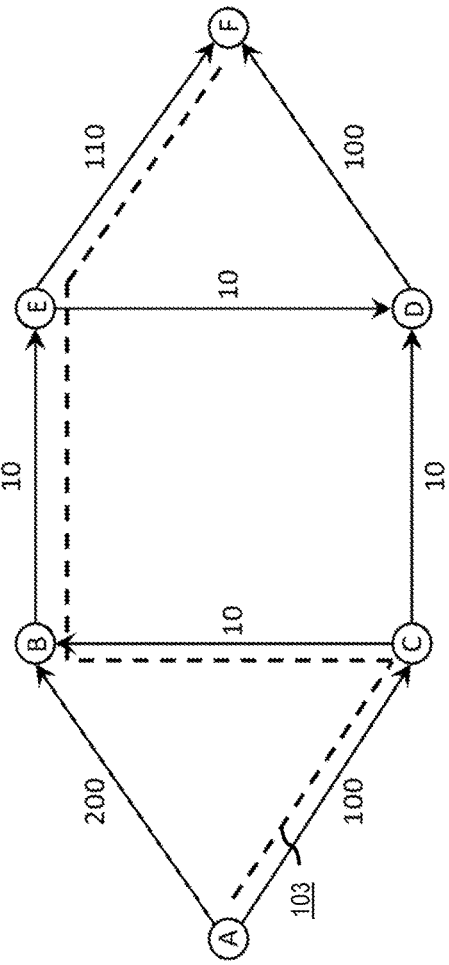

FIG. 1A shows an example graph 100 of a portion of a transportation network comprising nodes A-F and the links between each node as depicted. In this example, the constraint parameter for determining a MOAP is a time constraint δ, which is set equal to 250 time units for illustration. Accordingly, the numbers shown by each of the links represent the travel time of each link. The measurement unit of the travel time is not depicted in FIG. 1A, but can be expressed in any time unit. As shown, an original path 101 from a starting node A to a destination node F spans the links between the nodes A, C, D, and F, and is designated as the path <A,C,D,F>. There are three possible alternative paths from node A to node F, namely path <A,B,E,F>, path <A,C,B,E,F>, and <A,C,B,E,D,F>. A total travel time for each of the three paths can be calculated by adding the travel times of each link in the respective paths. Based on this travel time or constraint analysis, path <A,B,E,F> cannot be the MOAP for the original path 101 because its total travel time is 320, exceeding the time constraint parameter of 250. Both of the other two alternative paths (e.g., path <A,C,B, E,F> and path <A,C,B,E,D,F> have travel times of 230, satisfying the time constraint. However, the alternative path <A,C,B,E,F> has one common link with the original path <A,C,D,F> which is the link <A,C>, whereas the alternative path <A,C,B,E,D,F> has two common links which are the links <A,C> and <D,F>. Thus, as shown in FIG. 1B, path <A,C,B,E,F> is a MOAP 103 of the original path 101 of FIG. 1A.

Based on the example above, in one embodiment, a baseline approach to computing a MOAP for a given path P is enumerating all the possible overlap combinations of all possible paths between the starting point and destination of the path P, and finding the minimum one that satisfies a specified constraint parameter (e.g., a travel time constraint δ). For example, the MOAP computation process can start with zero overlap by removing all links of an original path P from a directed graph G of the transportation network spanning the starting point (e.g., $node_1$) and destination (e.g., $node_n$) of the original path P. The shortest path P' from $node_1$ to $node_n$ that has minimum overlap (e.g., zero-link overlap with the original path P) is then computed to compare against a specified constraint parameter. As previously discussed, the constraint parameter can be any cost parameter such as travel-time, distance, fuel consumption, safety, etc. For example, when the computing a MOAP based on a travel-time constraint, "shortest" path refers to shortest travel time. Depending on the constraint parameter specified, "shortest" can also refer to shortest distance, least amount of fuel consumed, safest route, etc.

If the resulting travel time or other constraint value for the computed shortest path P' is no greater than the corresponding constraint parameter (e.g., time constraint δ), then P' is a solution or MOAP. Otherwise, one-link combinations can be considered by adding back the first link of P and re-computing the shortest path P'. If the resulting travel time or constraint value for the path P' is no greater than constraint parameter (e.g., time constraint δ), then P' is a solution or MOAP. Otherwise, the first link is removed, and the second link is added to P' to re-compute the shortest path to compare against the constraint parameter. This process can continue from all possible 1-link combination to all possible n-link combinations until a solution or MOAP is found. In other words, if none of the one-link overlap combinations satisfies the constraint parameter (e.g., time constraint δ), then consider two-link overlap combinations, then three-link, four-link, and so on, until either a solution is found or all alternatives have been explored (in which case a MOAP does not exist). For the example of FIGS. 1A and 1B, the overlap combinations to be explored are: φ (the empty set), one-link overlap combinations {<A,C>}, {<C,D>}, {<D,F>}, two-link overlap combinations {<A,C>, <C,D>}, {<C,D>,<D,F>}, {<A,C>,<D,F>}, three-link overlap combinations {<A,C>,<C,D>,<D,F>}.

Based on the illustration above, it is apparent that the search space of the above baseline approach is the powerset of P, and thus the worst case complexity is the $2^n$. In other words, the computational cost for computing a MOAP using the baseline approach increases exponentially with the number of links of P. For example, if the path P has 18 links, then the approach has to compute a shortest path for $2^{18}$ or 262,144 times. This can be very computationally expensive, particularly in resource constrained devices such as in-vehicle systems, embedded systems, portable navigation devices, mobile devices, etc.

Figure 2:
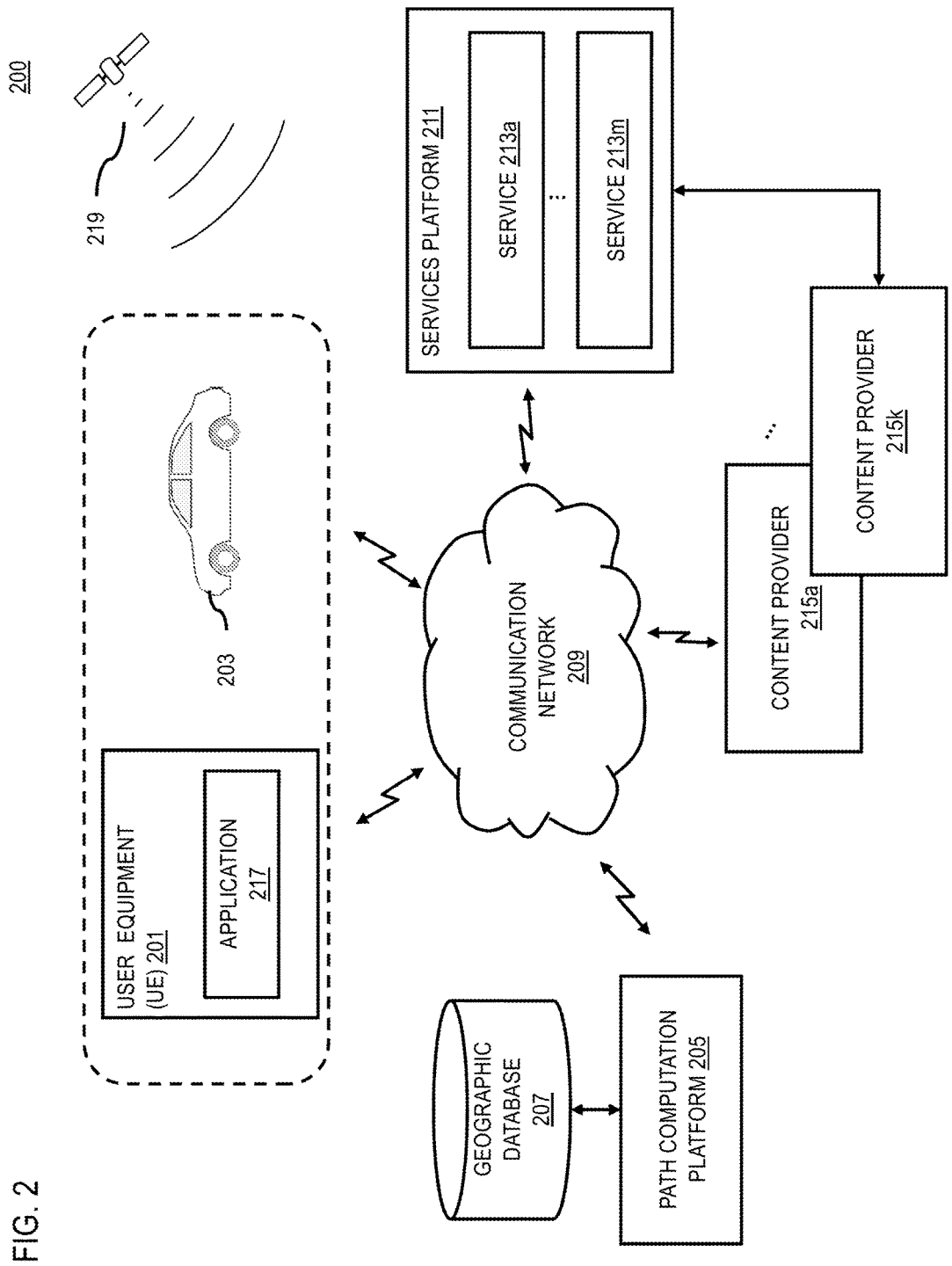
FIG. 2 is a diagram of a system for providing a minimum overlapping alternative path, according to one embodiment.

To address this problem, a system 200 as shown in FIG. 2 introduces a capability to improve the efficiency (e.g., reduce needed computational resources) of MOAP computation by reducing the number of links or portions of a potential candidate paths to process when varying overlap combinations to compute a constrained MOAP (e.g., constrained by travel time, distance, fuel consumption, safety, etc.). For example, the embodiments described herein are based on the observation that in some cases, some links or portions of P are indispensable to satisfy a specified constraint parameter (e.g., a required time constraint). That is, these links must appear in an alternative path in order for the time constraint or constraint parameter to be satisfied. In one embodiment, these links are referred to as critical links. The critical links form an invariable portion across all the overlap combinations. As a result, for varying overlap combinations, the system 200 can consider or process just the non-critical links of a potential alternative path to determine a MOAP. Because the computation associated with the embodiment of the baseline approach to computing a MOAP is exponential with respect to the number of links or the number of portions a path is divided into, a reduction in the number of links to process also results in an exponential reduction of the computational resources needed to perform the MOAP computation as discussed with respects to the various embodiment described herein.

For example, returning to the example of FIGS. 1A and 1B, the link <A,C> of the graph 100 is a critical link for computing a MOAP from A to F because any path that does not include the link <A,C> (e.g., any path starting with the only alternative link <A,B>) exceeds the required time constraint of δ=250. Thus, for overlap combinations in this example, the system 200 only needs to process the powerset of {<C,D>,<D,F>} which includes φ (the empty set), one-link overlap combinations {<C,D>}, {<D,F>}, and two-link overlap combinations {<C,D>,<D,F>}. Compared with the baseline approach, the size of the search space is reduced from 8 to 4 by removing the critical links. In general, each critical link can reduce the size of powerset (and hence the worst case computational cost) by half.

In one embodiment, in addition to critical links, the system 200 can identify bivalent nodes and combines the links associated with them into super links. The super links can then substitute for the links that were combined into each super link when computing a MOAP. In this way, the number of links to consider is further reduced to advantageously reduce the computational resource burden of computing a MOAP. In one embodiment, a bivalent node is a node that has exactly two links associated with it. For example, let $<v_1,v_2>, <v_2,v_3>, \ldots, <v_{n-1},v_n>$ be a sequence of links in which $v_2, v_3, \ldots, v_{n-1}$ are bivalent nodes and $v_1$ and $v_n$ are non-bivalent nodes. For MOAP computation, the system 200 can treat the link chain as a single link that starts at $v_1$ and ends at $v_n$. This single imaginary link is, for instance, a super link. In one embodiment, the travel time or other constraint value of the super links is the sum of the travel times or constraint value of each constituting link.

Figure 3:
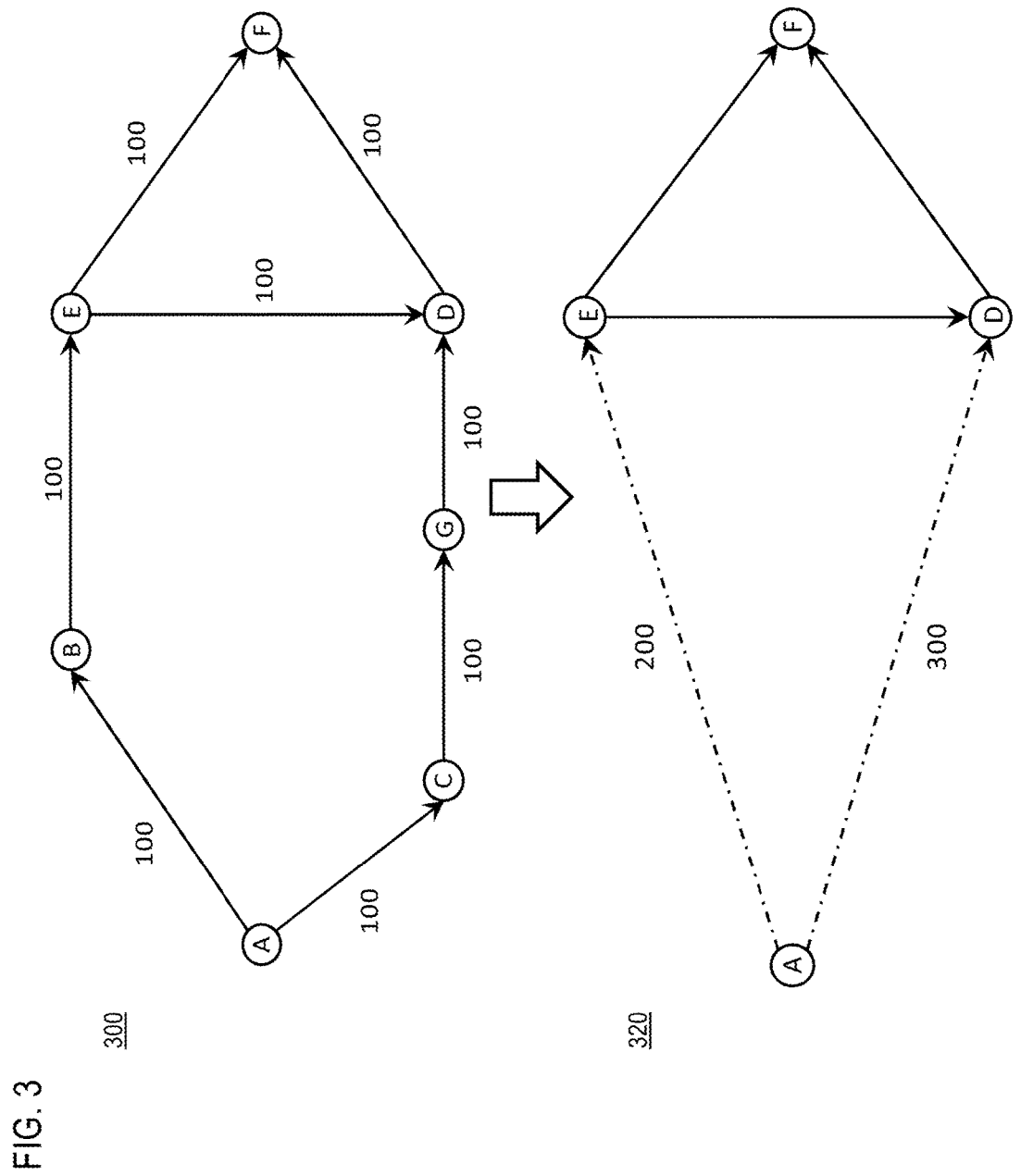
FIG. 3 is a diagram illustrating a process for combining bivalent nodes to provide a minimum overlapping alternative path, according to one embodiment.

FIG. 3 is a diagram illustrating a process for combining bivalent nodes into super links to provide a minimum overlapping alternative path, according to one embodiment. As shown in graph 300, nodes B, C, and G are bivalent nodes because they have exactly two links associated with them (e.g., one incoming link and one outgoing link). Thus, the link chain <A,B>, <B,E> can be combined as a super link <A,E>, and the link chain <A,C,G,D> can be combined as a super link <A,D>, as shown in graph 320. In addition, the travel times depicted in the graph 300 for the link chain <A,B>, <B,E> (e.g., 100 and 100, respectively) can be added to determine the travel time for the super link <A,E> (e.g., 200). Similarly, the travel times for the link chain <A,C,G,D> (e.g., 100, 100, and 100) can be added to determine the travel time for the super link <A,D> (e.g., 300). The system 200 can then process the simplified graph 320 (e.g., which includes fewer links) in place of the original graph 300 to compute a MOAP, thereby advantageously reducing the computational resources needed to compute the MOAP.

Returning to FIG. 2, the system 200 comprises a path computation platform 205 with connectivity to the geographic database 207 over a communication network 209. In one embodiment, the path computation platform 205 performs the processes for providing a MOAP for used by devices of the system 200 (e.g., a user equipment or device (UE) 201 and/or vehicle 203). In this example, the UE 201 and/or vehicles 203 can be used as navigation and/or mapping devices to provide navigation or routing services for users traveling over a road network represented in the geographic database 207 as nodes and links. Although the vehicle 203 is depicted as an automobile, it is contemplated that the vehicle 203 can be any type of transportation vehicle manned or unmanned (e.g., planes, aerial drone vehicles, motor cycles, boats, bicycles, etc.), and the UE 201 can be a mobile or embedded device associated with any of the types of vehicles or a person or thing traveling through the transportation network of the geographic database 207. In one embodiment, the UE 201 and/or vehicle 203 are end user devices that are clients or consumers of navigation and/or mapping related services.

In one embodiment, the UE 201 and/or vehicle 203 are configured to report location data or points to facilitate determining travel paths according to the various embodiments described herein. For example, when computing a MOAP as a return path, the recorded location points can be used to determine the original path against which the MOAP is computed. In other embodiments, historical location data can be used to determine previously traveled paths, so that new paths can be suggested by determining a MOAP against one or more of the previously traveled paths. For example, as noted above, tourists can request the system 200 compute a MOAP against previously traveled paths to experience new locations.

In other words, when a UE 201 and/or vehicle 203 requests navigation or mapping related services, the travel path of the device reconstructed from the collected probe or location data can be used as at least on input for providing the requested services (e.g., routing services that provide MOAP computation). In one embodiment, these services can be provided by a service platform 211, one or more services 213a-213m (also collectively referred to as services 213), one or more content providers 215a-215k (also collectively referred to as content providers 215), or a combination thereof. In one embodiment, the UE 201 and/or vehicle 203 may execute a client application 217 to access the services or functions of the service platform 211, the services 213, and/or the content providers 215. In one embodiment, the client application 217 may perform one or more functions of the path computation platform 205 for filtering location points in sample trajectory. In this embodiment, the client application 217 may act in addition to or in place of the path computation platform 205.

By way of example, location data or points are individual data records that record location and/or telemetry data collected at a point in time. In one embodiment, a location point can include attributes such as a location (e.g., provided a geospatial coordinates such as latitude and longitude), a heading, a speed, a time, or a combination thereof of each of the plurality of devices. This list of attributes is provided by way of illustration and not limitation. It is contemplated that any combination of these attributes or other attributes may be recorded as a probe point. In one embodiment, the UE 201 and/or vehicle 203 may include sensors for reporting measurements and/or reporting attributes associated with the device's locations and/or trajectories. The attributes can also be any attribute normally collected by an on-board diagnostic (OBD) system of the vehicle, and available through an interface to the OBD system (e.g., OBD II interface or other similar interface). For example, these attributes can include activation of backup sensors, steering angle, activation of brakes, etc. In one embodiment, the UE 201 and/or vehicle 203 may be configured with one or more sensors for collecting the probe or location trace data sampling rates more dense that reported or used for path reconstruction. The UE 201 and/or vehicle 203 can then provide location updates according to the filtering or location update policies generated according to the various embodiments described herein. By way of example, the sensors may include location sensors (e.g., GPS), accelerometers, compass sensors, gyroscopes, altimeters, etc.

By way of example, the UE 201 may be any mobile computer including, but not limited to, an in-vehicle navigation system, vehicle telemetry device or sensor, a personal navigation device ("PND"), a portable navigation device, a cellular telephone, a mobile phone, a personal digital assistant ("PDA"), a wearable device, a camera, a computer and/or other device that can perform navigation or location based functions, i.e., digital routing and map display. In some embodiments, it is contemplated that mobile computer can refer to a combination of devices such as a cellular telephone that is interfaced with an on-board navigation system of an autonomous vehicle or physically connected to the vehicle for serving as the navigation system.

As described, the UE 201 and/or vehicle 203 may be configured with applications 217 for interacting with the path computation platform 205, geographic database 207, service platform 211, services 213, content providers 215, or a combination thereof. Through these services, the applications 217 may acquire and/or generate routing information (e.g., including MOAP routing), navigation information, location information, mapping information, other data associated with providing a MOAP.

As discussed above, the UE 201 and/or vehicle 203 may be configured with various sensors for acquiring and/or generating probe or location data at adaptive sampling rates. For example, the sensors may be used as GPS receivers for interacting with one or more satellites 219 to determine and track the current speed, position and location of a vehicle travelling along a roadway. In addition, the sensors may gather tilt data (e.g., a degree of incline or decline of the vehicle during travel), motion data, light data, sound data, image data, weather data, temporal data and other data associated with the UE 201 and/or vehicle 203. Still further, the sensors may detect local or transient network and/or wireless signals, such as those transmitted by nearby devices during navigation along a roadway. This may include, for example, network routers configured within a premise (e.g., home or business), another UE 201 or vehicle 203, or a communicable traffic system (e.g., traffic lights, traffic cameras, traffic signals, digital signage).

By way of example, the path computation platform 205 may be implemented as a cloud based service, hosted solution or the like for performing the above described functions. Alternatively, the path computation platform 205 may be directly integrated for processing data generated and/or provided by the service platform 211, services 213, content providers 215, and/or applications 217. Per this integration, the path computation platform 205 may perform client-side adaptive location sampling as described with respect to the various embodiments described herein.

By way of example, the communication network 209 of system 200 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the path computation platform 205 communicates with other components of the system 200 using well known, new or still developing protocols. In this context, a protocol includes a set of rules defining how the network nodes within the communication network 209 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 4:
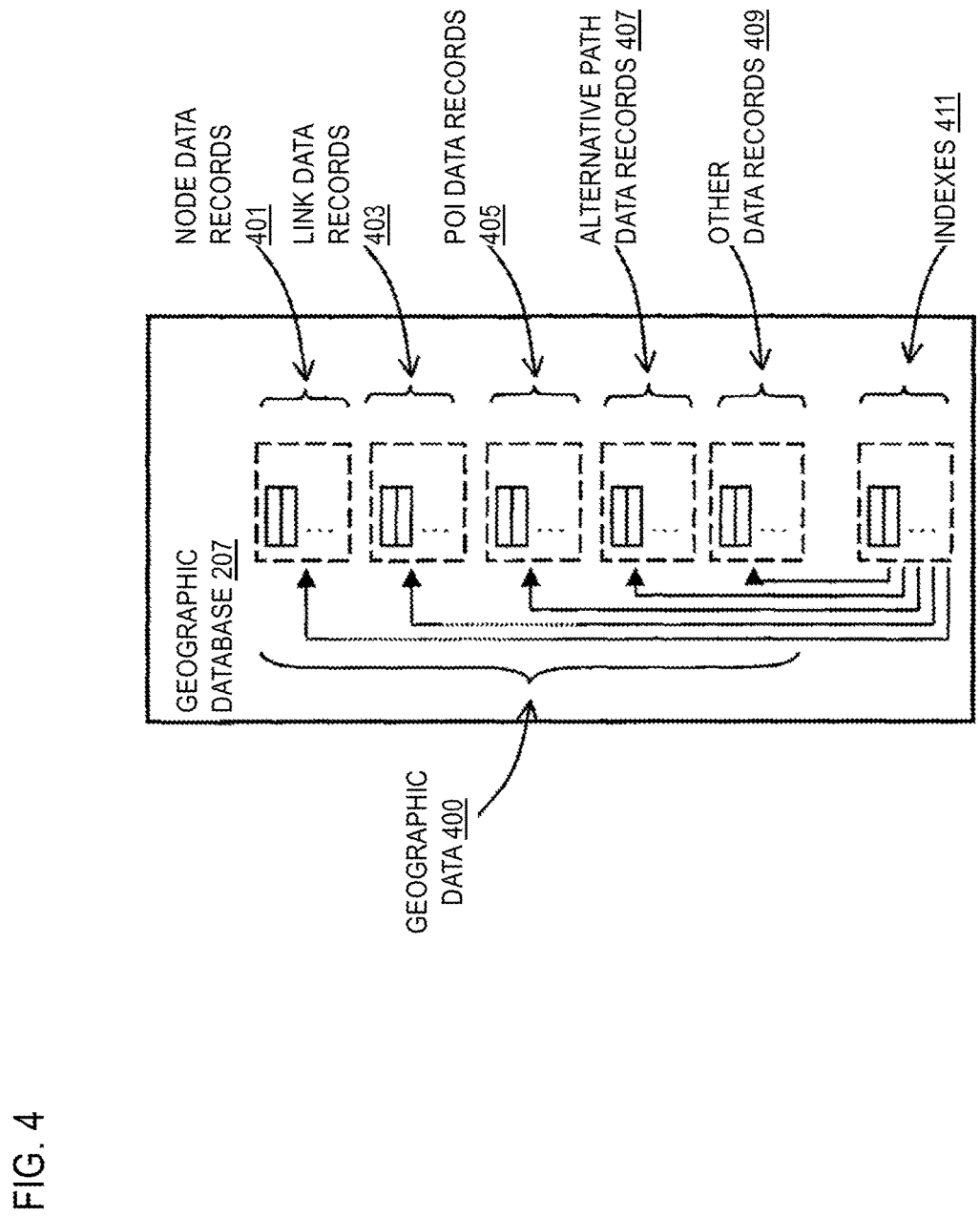
FIG. 4 is a diagram of a geographic database used for providing a minimum overlapping alternative path, according to one embodiment.

FIG. 4 is a diagram of the geographic database 207, according to one embodiment. In one embodiment, the geographic or map database 207 includes geographic data 400 used for (or configured to be compiled to be used for) mapping and/or navigation-related services, such as for route information (e.g., including MOAP computation), service information, estimated time of arrival information, location sharing information, speed sharing information, and/or geospatial information sharing, according to exemplary embodiments. For example, the geographic database 207 includes node data records 401, road segment or link data records 403, POI data records 405, alternative path data records 407, other data records 409, and/or indexes 411 for example. More, fewer or different data records can be provided.

In one embodiment, the indexes 411 may improve the speed of data retrieval operations in the geographic database 207. In one embodiment, the indexes 411 may be used to quickly locate data without having to search every row in the geographic database 207 every time it is accessed. In one embodiment, the other data records 409 include cartographic ("carto") data records, routing data, and maneuver data. As noted above, the maneuver data identify potential maneuvers within a network comprised of two or more adjacent road links. In other words, a maneuver indicate possible turns or other actions a device traveling a transportation network can take. In one embodiment, maneuvers are defined at intersections nodes where different turns or actions can be taken. Each maneuver would then comprise the links making up each possibility (e.g., links indicating a left turn at the intersection node, a right turn at an intersection node, continuing straight at an intersection node, etc.).

In one embodiment, one or more portions, components, areas, layers, features, text, and/or symbols of the POI or event data can be stored in, linked to, and/or associated with the geographic data 400 using the POI data records 405. For example, one or more portions of a POI and/or characteristics of the POI (e.g., descriptive metadata, related event data, etc.) can be matched with respective map or geographic records via position or GPS data associations (such as using known or future map matching or geo-coding techniques), for example. In one embodiment, the POI data records 405 may also include information on locations of traffic controls (e.g., stoplights, stop signs, crossings, etc.).

In exemplary embodiments, the road segment or link data records 403 are links or segments representing roads, streets, or paths, as can be used in the calculated route or recorded route information. The link data records 403 can include road density information that represent at least a physical length of a link. In some embodiments, the length or road density of link can be measured directly from the road way or may be calculated as the distance between the starting and ending nodes of the link. In one embodiment, the one or more adjacent links can be combined into a super link as discussed in the various embodiments described herein. In this case, the link data records 403 can also store information on super links (e.g., combinations or sequences of links) that have been created, and information on the regular links included the corresponding super link. The link data records can also indicate a direction of travel along the link to facilitate determining available paths through a road network. In one embodiment, the node data records 401 are end points corresponding to the respective links or segments of the road segment data records 403.

The road link data records 403 and the node data records 401 represent a road network, such as used by vehicles, cars, and/or other entities. In other words, the nodes and links of the data records 401 and 403 comprise a system for representing the geospatial characteristics of a transportation network where the nodes represent various location points (e.g., latitude and longitude) of the network and the links represent an extent of a road or path between the nodes. Generally, the nodes are located at intersections points of the road network to minimize the number of nodes needed to represent a transportation network. However, in some embodiments, a node can also fall at a non-intersection point. In which, the node at the non-intersection can be a shape node which can be used to indicate or more closely follow a road or path with a more complex shape. Alternatively, the geographic database 207 can contain path segment and node data records or other data that represent pedestrian paths or areas in addition to or instead of the vehicle road record data, for example.

The road link and nodes can be associated with attributes, such as a functional class, a road density or link length, a speed attribute (e.g., speed limit along a link, a free-flow speed of traffic along a link, and/or any other indication of an expected speed of travel along the link), parking availability information, geographic coordinates, street names, address ranges, turn restrictions at intersections, and other navigation related attributes, as well as POIs, such as traffic controls (e.g., stoplights, stop signs, crossings, etc.), gasoline stations, hotels, restaurants, museums, stadiums, offices, automobile dealerships, auto repair shops, buildings, stores, parks, etc. As indicated above, the geographic database 400 can include data about the POIs and their respective locations in the POI data records 405. The geographic database 400 can also include data about places, such as cities, towns, or other communities, and other geographic features, such as bodies of water, mountain ranges, etc. Such place or feature data can be part of the POI data or can be associated with POIs or POI data records 405 (such as a data point used for displaying or representing a position of a city).

In one embodiment, the geographic data 400 also includes alternative path data records 407 that provides and/or stores data for computing a MOAP according the various embodiments described herein. For example, the alternative path data records 407 can store information identifying constraint parameters and/or overlap criteria for computing a MOAP. In addition, the alternative path data records 307 can identify critical links or non-critical links for various paths resulting from the constraint parameters. For example, the data records 407 can store previously computed MOAPs for later retrieval by the system 200. In one embodiment, the MOAPs may be stored based on user request or command. In addition or alternatively, MOAPs can be precomputed by the system 200 for different node pair combinations for road networks represented in the geographic database. In other words, the data records can also store precomputed fastest alternative routes or trunks between node pairs evaluated on a node pair basis to determine fastest alternative routes, travel times, and/or the like. The precomputed data can be generated for the most popular routes (e.g., as determined from reported probe traces or trajectories), and/or can be compiled as the system 200 computes for evaluation received location points.

In one embodiment, the geographic database 400 can be maintained by the content provider 215 in association with the service platform 211 (e.g., a map developer). The map developer can collect geographic data to generate adaptive location sampling intervals and enhance the geographic database 207. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 400 can be a master geographic database stored in a format that facilitates updating, maintenance, and development. For example, the master geographic database 400 or data in the master geographic database 400 can be in an Oracle spatial format or other spatial format, such as for development or production purposes. The Oracle spatial format or development/production database can be compiled into a delivery format, such as a geographic data files (GDF) format. The data or publication thereof may be partitioned into channels configured for incremental updates. The data in the production and/or delivery formats can be compiled or further compiled to form geographic database products or databases, which can be used in end user navigation devices or systems.

For example, geographic data or geospatial information is compiled (such as into a platform specification format (PSF) format) to organize and/or configure the data for performing map or navigation-related functions and/or services, such as map annotation, route calculation, route guidance, map display, speed calculation, distance and travel time functions, and other functions, by a navigation device, such as by a UE 201 and/or vehicle 203, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 400 can be a master geographic database, but in alternate embodiments, the geographic database 400 can represent a compiled navigation database that can be used in or with end user devices (e.g., UE 201, vehicle 203, etc.) to provide navigation- or mapping-related functions. For example, the geographic database 400 can be used with the end user device 201 and/or 203 to configure the device for filtering location points in a sampled trajectory while maintaining path reconstructability as discussed with respect to the various embodiments described herein. In such a case, the geographic database 400 can be downloaded or stored on the end user device (e.g., UE 201, vehicle 203, etc.), such as in applications 217, or the end user device 201 or 203 can access the geographic database 400 through a wireless or wired connection (such as via a server and/or the communication network 209), for example.

Figure 5:
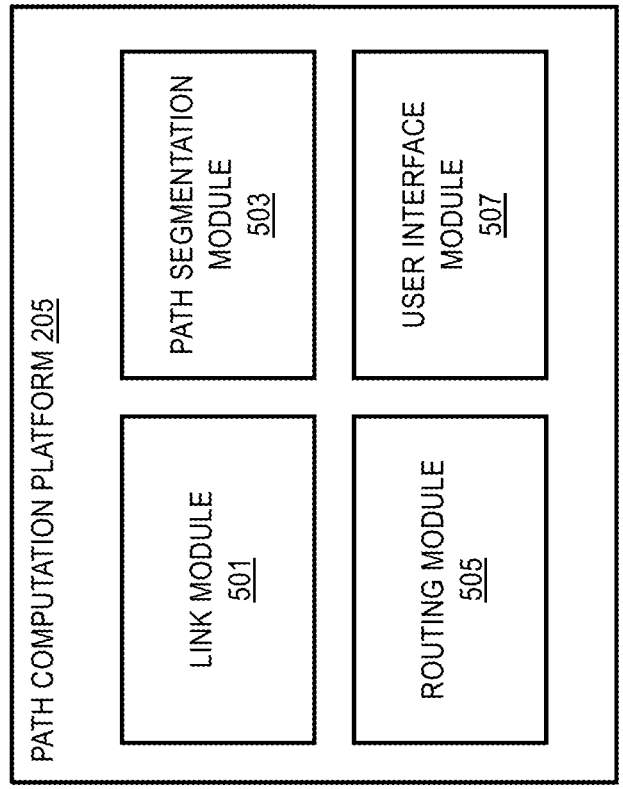
FIG. 5 is a diagram of the components of a path computation platform used for providing a minimum overlapping alternative path, according to one embodiment.

FIG. 5 is a diagram of the components of a path computation platform 205, according to one embodiment. By way of example, the path computation platform 205 includes one or more components for providing adaptive location sampling in mobile devices. It is contemplated that the functions of these components may be combined or performed by other components of equivalent functionality. In this embodiment, the path computation platform 205 includes a link module 501, a path segmentation module 503, a routing module 505, and user interface module 507. The above presented modules and components of the path computation platform 205 can be implemented in hardware, firmware, software, or a combination thereof. Though depicted as a separate entity in FIG. 2, it is contemplated that the path computation platform 205 may be implemented as a module of any of the components of the system 200. In another embodiment, one or more of the modules 501-507 may be implemented as a cloud based service, local service, native application, or combination thereof. The functions of these modules are discussed with respect to FIGS. 6-10 below.

Figure 6:
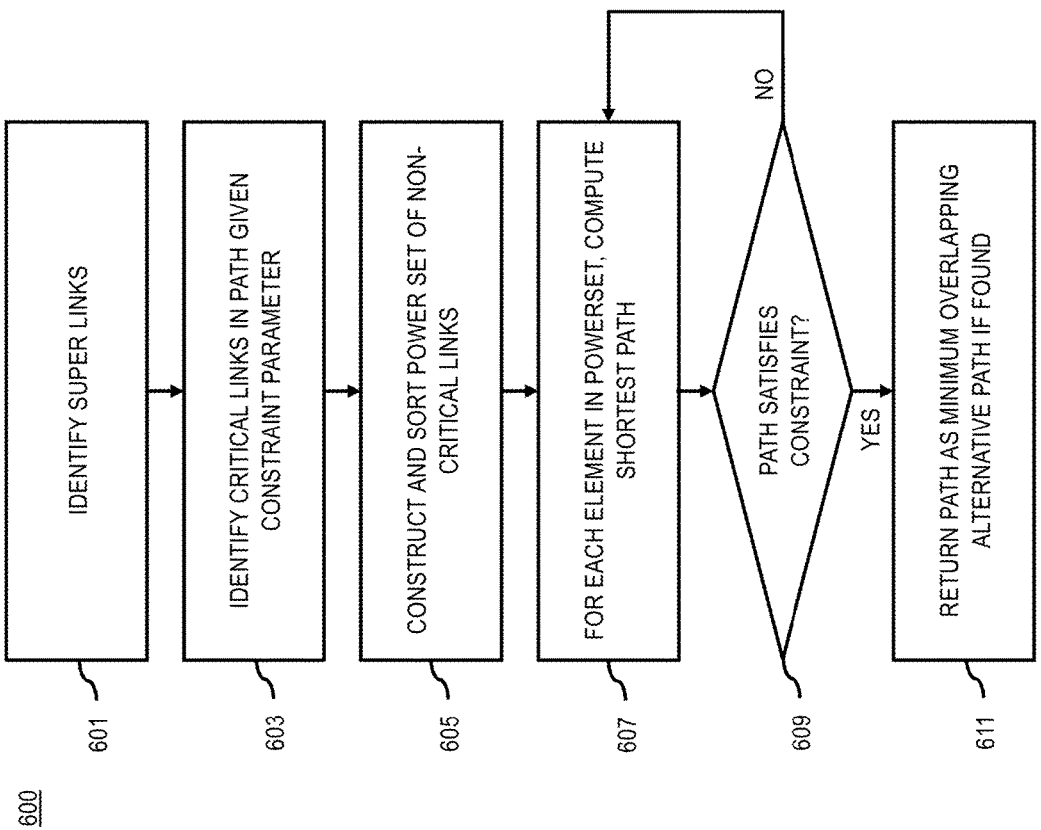
FIG. 6 is a flowchart of a process for providing a minimum overlapping alternative path with respect to a travel network represented by nodes and links of a geographic database, according to one embodiment.
Figure 13:
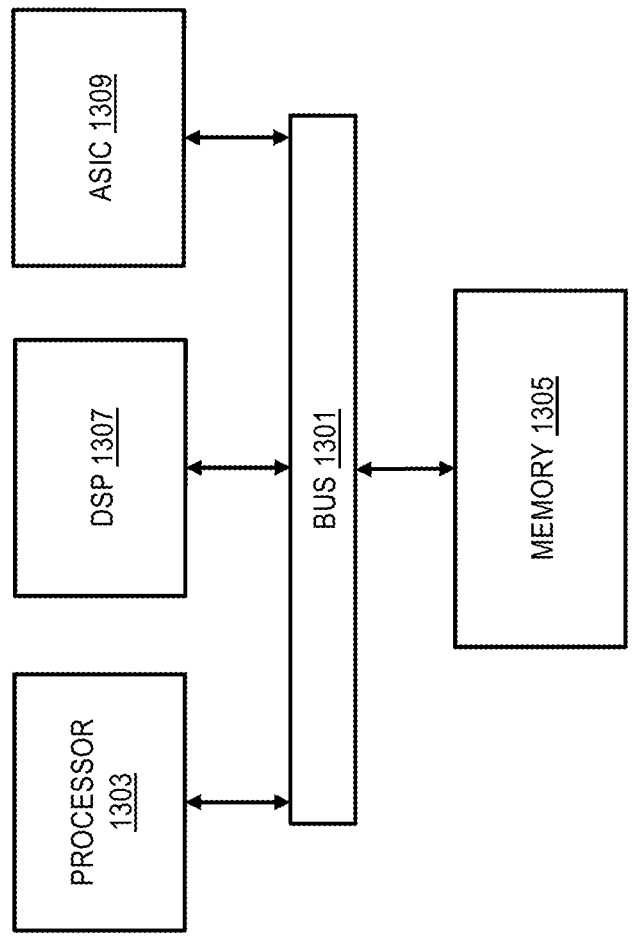
FIG. 13 is a diagram of a chip set that can be used to implement an embodiment.

FIG. 6 is a flowchart of a process for providing a minimum overlapping alternative path with respect to a travel network represented by nodes and links of a geographic database, according to one embodiment. In various embodiments, the path computation platform 205 and/or the modules 501-507 of the path computation platform 205 as shown in FIG. 5 may perform one or more portions of the process 600 and may be implemented in, for instance, a chip set including a processor and a memory as shown in FIG. 13. As such, the path computation platform 205 and/or the module 501-507 can provide means for accomplishing various parts of the process 600, as well as means for accomplishing embodiments of other processes described herein in conjunction with other components of the system 200. Although the process 600 is illustrated and described as a sequence of steps, its contemplated that various embodiments of the process 600 may be performed in any order or combination and need not include all of the illustrated steps.

The process 600 is a process of computing a minimum overlapping alternative path (MOAP) that is initiated after the path computation platform 205 has been requested to calculate a minimum overlapping alternative path for a given path. This request can be initiated automatically by the path computation platform 205 (e.g., when a traffic incident such as an accident is detected in an initiate route or path), can be initiated by user (e.g., entering a request into a navigation or mapping system to provide a minimum or non-overlapping return route). For example, the path computation platform 105 can detect a traffic incident along the path (e.g., by receiving an alert from a traffic monitoring or reporting service), and then initiate the calculating of the minimum overlapping alternative path in response to the detected traffic incident.

In step 601, the link module 501 begins the MOAP computation process by identifying bivalent nodes and then combining the links associated with them as super links. In other words, the link module 501 can combine two adjacent links of the set of links into one or more super links when the two adjacent links include bivalent nodes. In one embodiment, the one or more super links replace the two adjacent links in the determining of the one or more critical links, the one or more non-critical links, or a combination thereof. By way of example, the bivalent nodes and links can be identified from a set of nodes and links that describe the path of interest. In one embodiment, the set of nodes and links can represented by a directed graph G comprising the nodes and links spanning a starting point and destination of the given original or reference path. In one embodiment, the graph G may include all nodes and links reachable from either the starting or destination nodes within the constraint parameter (e.g., travel time constraint) or some multiple or window beyond the constraint parameter. Given a path of interest, the link module 601, for instance, can determine a set of nodes and links of a geographic database (e.g., geographic database 207) that delineate the path between a first location (e.g., proximate or corresponding to a starting point or node) and a second location (e.g., proximate or corresponding to a destination point or node of the path).

In one embodiment, the link module 501 can create super links as follows. For example, let $(v_1, v_2), (v_2, v_3), \ldots, (v_{n-1}, v_n)$ be a link chain, where $v_1$-$v_n$ are nodes defining the respective links. The link module 501 can determine if adjacent links in this chain are combinable if two conditions are satisfied. First, for both $v_1$ and $v_n$, their degree of freedom is 1 or greater than 2. The degree of freedom, for instance, is the total number incoming or outgoing links at the node. In other words, $v_1$ is either a node without any incoming link or an intersection node, and $v_n$ is either a node without any outgoing link or an intersection node. Second, for $v_2, \ldots, v_{n-1}$, their degree is exactly 2. In other words, $v_2, \ldots, v_{n-1}$ are not intersection nodes. In one embodiment, a super link is a combinable link chain with the intermediate nodes removed but with the link geometries preserved.

In step 603, the link module 501 identifies the set $S_{CL}$ of critical links from a set of links comprising the original or reference path (e.g., designated as L(P)). The critical links are determined with respect to a constraint parameter. In this example, the constraint parameter is a time constraint δ, but can also be any other constraint parameter including, but not limited to, a distance constraint (e.g., describing a maximum distance to travel), a fuel consumption constraint (e.g., describing a maximum about of fuel to use), a safety constraint (e.g., a maximum aggregate safety factor based, e.g., on accident rates, crime rates of surrounding areas, etc.), and/or the like. For example, the one or more critical links are to be traveled or included in any alternative path between a first location (e.g., starting node) and a second location (e.g., a destination node) of the original path to satisfy the constraint parameter (e.g., to complete travel within the time constraint δ

In one embodiment, the link module determines a graph G comprising a set of nodes and links representing a portion of a transportation network encompassing a path of interest P, where P=<$node_1$, $node_2$, . . . , $node_n$>. For a specified constraint parameter such as a time-constraint δ, the link module 501 can identify critical links as follows. First, the link module 501 denotes by L(P) the set of links in P. For each link l in L(P), the link module 501 can interact with the routing module 505 to compute the shortest path from $node_1$ to $node_n$ with l disallowed and all the other links in L(P) allowed. In one embodiment, the routing module 505 can disallow l by removing l from G or assigning infinite travel time to the link. For example, if the travel time of the shortest path is greater than δ, then l is a critical link. The link module 501 denotes by $S_{CL}$ the set of links in L(P) that have been determined to be critical links. The remaining links in L(P) that have not been determined to be critical links are non-critical links. In other words, in one embodiment, the set $S_{NCL}$ of non-critical links is determined as $S_{NCL}=L(P)-S_{CL}$.

In step 605, the routing module 505 constructs a powerset of the one or more non-critical links (e.g., $S_{NCL}$). An element of the powerset that corresponds to the path P is then removed from the powerset. In other words, the routing module 505 constructs the powerset of $S_{NCL}$ and denotes it by $\Omega(S_{NCL})$. The routing module 505 then removes element corresponding to the links of the path P by performing the operation, $\Omega(S_{NCL})=\Omega(S_{NCL})-\{L(P)\}$. The routing module 505 also sorts $\Omega(S_{NCL})$ according to any sorting criterion or sequence (e.g., element size such as number of links in an element, total length of links in each element, etc.). For example, the routing module 505 can sort $\Omega(S_{NCL})$ in ascending order of element size where, e.g., each element of $\Omega(S_{NCL})$ is a subset of $S_{NCL}$ and thus the element size is the size of the subset. If the goal of MOAP is minimizing the overlap of path length (instead of number of common links), then $\Omega(S_{NCL})$ may be sorted in order of link length.

In step 607, in ascending order of the sorted powerset, the routing module 505 computes a shortest path spanning a first node and last node included in each element of the sorted powerset until the computed shortest path satisfies the constraint parameter. For example, for each element S of $\Omega(S_{NCL})$, the routing module 505 computes the shortest path from $node_1$ to $node_n$ with the links in $S \cup S_{CL}$ allowed and all the other links in L(P) disallowed. If the travel time or constraint value of the shortest path is > time constraint δ or any other specified constraint parameter (step 609), then continue the loop of step 607. Otherwise, the routing module 505 designate or assigns the resulting computed shortest path as MOAP. This resulting path is returned as the MOAP (step 611). If step 607 completes without a MOAP being found after all elements of the powerset have been process, then a MOAP does not exist.

By way of illustration, the process 600 can be described with the example of FIGS. 1A and 1B above. In this example, it is still assumed that the time constraint is 250. In this case, the link module 501 identifies no super links because there are not bivalent nodes in the graph 100. Based on the travel times listed in graph 100, the link module 501 identifies that the link <A,C> is the only critical link. Thus $S_{CL}=\{<A,C>\}$ and $S_{NCL}=\{<C,D>,<D,F>\}$. The construction and sorting of the powerset of the non-critical links results in $\Omega(S_{NCL})=\{\{\phi\},\{<C,D>\},\{<D,F>\}\}$. The routing module 505 then computes the shortest path from A to F with <A,C> allowed and <C,D>,<D,F> disallowed. This computation results in the shortest path <A,C,B,E,F> with a computed travel time equal to 230, which is less than the time constraint of 250. Thus, path <A,C,B,E,F> is a MOAP.

Figure 7:
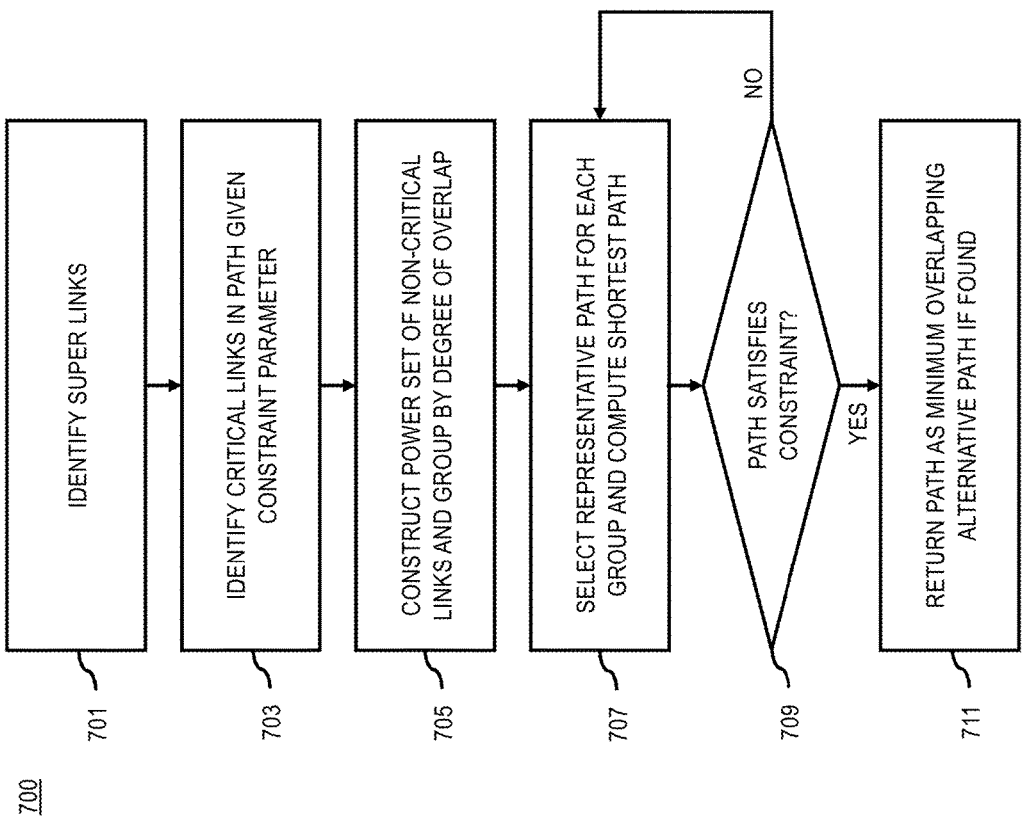
FIG. 7 is a flowchart of a process for providing a minimum overlapping alternative path using representative paths, according to one embodiment.

FIG. 7 is a flowchart of a process for providing a minimum overlapping alternative path using representative paths, according to one embodiment. In various embodiments, the path computation platform 205 and/or the modules 501-507 of the path computation platform 205 as shown in FIG. 5 may perform one or more portions of the process 700 and may be implemented in, for instance, a chip set including a processor and a memory as shown in FIG. 13. As such, the path computation platform 205 and/or the module 501-507 can provide means for accomplishing various parts of the process 700, as well as means for accomplishing embodiments of other processes described herein in conjunction with other components of the system 200. Although the process 700 is illustrated and described as a sequence of steps, its contemplated that various embodiments of the process 700 may be performed in any order or combination and need not include all of the illustrated steps.

The process 700 provides an alternate embodiment for determining a MOAP that provides additional optimizations to reduce computational resources needed to compute a MOAP when less computational resources are to be used or when resources may be more limited, e.g., in mobile device, portable devices, in-vehicle systems, etc. The process 700 begins similarly to the process 600 describe with the initial steps 701-705 the same or similar to their equivalent steps of the process 600.

For example, at step 701, the link module 501 identifies bivalent nodes and combine the links associated with them as super links as described with respect to step 601 of FIG. 6. At step 703, the link module 501 then identifies critical and non-critical links of a path of interest as described in step 603 of FIG. 6, by creating the set $S_{CL}$ of critical links in L(P) for δ and the set $S_{NCL}$ of non-critical links ($S_{NCL}$=L(P)−$S_{CL}$). At step 705, the routing module 505 constructs a powerset $\Omega(S_{NCL})$ of the one or more non-critical links (e.g., $S_{NCL}$). As described above, the element of the powerset that corresponds to links of the path P is removed from the powerset as denoted by $\Omega(S_{NCL})=\Omega(S_{NCL})-\{L(P)\}$. The resulting powerset is then sorted according to a sorting criterion.

At the second part of step 705, the process 700 differs from the process 600 by grouping each element of the sorted powerset into one or more groups according to a degree of link overlap between the one or more non-critical links of the path P. In one embodiment, the routing module 505 groups the resulting powerset $\Omega(S_{NCL})$ by element size, e.g., the 0-overlap group (including only one member which is φ, i.e., an empty set), 1-overlap group (including all elements with one link overlapping between the alternative path and the path P), 2-overlap group (including all elements with two links overlapping), and so on.

At step 707, the routing module 505 selects a representative element or path from each of the one or more groups. For example, the routing module 505 can designate a representative for each group which is the member or element with the minimum travel time, the maximum length, the fastest speed, etc. depending on what constraint parameter is being used.

Accordingly, at step 709, instead of checking every element of $\Omega(S_{NCL})$ to determine whether the corresponding path satisfies the constraint parameter, the routing module 505 can check only the representatives from each group. For example, in ascending order of X, for the representative r of each X-overlap group, compute the shortest path from $node_1$ to $node_n$ with r allowed and all the other links in P disallowed. As a result, if the original path has n links, then steps 707 and 709 loop for at most 2n times, which can further reduce needed computational resources over the process 600 when the system 200 is configured to favor saving resources over the optimal MOAP determination provided by the process 600. The shortest path of the representative paths that satisfies the constraint parameter can then be returned as a MOAP (step 711). In one embodiment, if a MOAP is not found at step 707 and 709, the routing module 505 can find a shortest alternative of P and take it as a MOAP if it satisfies the time constraint. For example, given a path P from node A to node B, a shortest alternative path of P is a path from A to B that is different from P and with minimum travel time or other applicable constraint parameter. If the constraint parameter cannot be met by any alternative path, a MOAP does not exist.

In one embodiment, to calculate a shortest alternative path of P, the routing module 505 can let a path P=<$a_1, a_2, \ldots, a_n$>. For each node $a_i$ (where 1≤i≤n), and for each of its outgoing link ($a_i$, b) that is not in P, the routing module 505 finds the shortest path from b to $a_n$. A concatenation the part of P until $a_i$, the link ($a_i$, b), and the shortest path from b to $a_n$ can be used to form an alternative path from $a_1$ to $a_n$. The shortest of these computed alternative paths is the shortest alternative of P.

Figure 8:
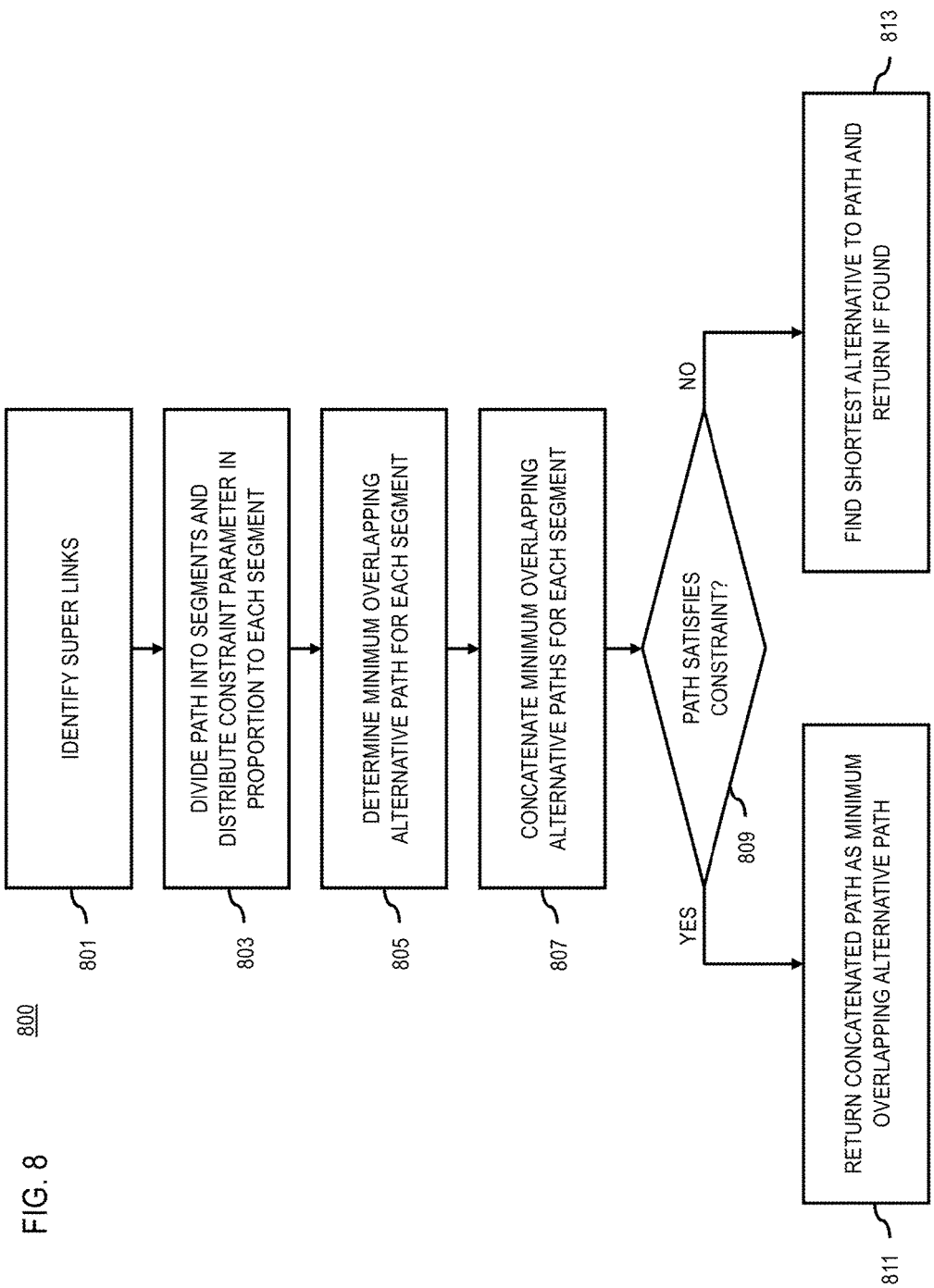
FIG. 8 is a flowchart of a process for segmenting a path to provide a minimum overlapping alternative path, according to one embodiment.

FIG. 8 is a flowchart of a process for segmenting a path to provide a minimum overlapping alternative path, according to one embodiment. In various embodiments, the path computation platform 205 and/or the modules 501-507 of the path computation platform 205 as shown in FIG. 5 may perform one or more portions of the process 800 and may be implemented in, for instance, a chip set including a processor and a memory as shown in FIG. 13. As such, the path computation platform 205 and/or the module 501-507 can provide means for accomplishing various parts of the process 800, as well as means for accomplishing embodiments of other processes described herein in conjunction with other components of the system 200. Although the process 800 is illustrated and described as a sequence of steps, its contemplated that various embodiments of the process 800 may be performed in any order or combination and need not include all of the illustrated steps.

The process 800 provides another alternate embodiment for determining a MOAP that provides additional optimizations beyond those provided in the processes 600 and 700 above to reduce computational resources needed to compute a MOAP when less computational resources are to be used or when resources may be more limited, e.g., in mobile device, portable devices, in-vehicle systems, etc.

As with the processes 600 and 700, the link module 501 begins the process 800 by identifying bivalent nodes of a path of interest P (e.g., the original path or reference path) and combine the links associated with them as super links as previously described (step 801).

At the step 803, the path segmentation module 503 divides the path of interest into one or more segments based on the maximum number of links. In one embodiment, the maximum number of links represents a maximum number of links or portion of a path that is configured to be process by a computing device (e.g., the path computation platform 205 or any of its components such as the routing module 505) in a single processing pass. For example, the path segmentation module 503 can denote by m the maximum number of links in L(P) that the a computing system (e.g., a computer or a cluster of computers) can process to determine a MOAP according to any of the embodiments described herein. In this case, m refers to the capacity of computation of the system, device, etc. that is computing a MOAP given an input path P.

Accordingly, the path segmentation module 503 divides P into segments such that each segment contains m links (or approximately m links if n is not divisible by m). It is noted that other segmentation metrics besides number of links can be used such as length (e.g., by dividing the path into segments of equal length or at fixed lengths). The path segmentation module 503 then distributes the time constraint parameter (e.g., time constraint δ) into each segment in proportion to the segment's travel-time, length, speed, and/or any other constraint value being used.

At step 805, the routing module 505 compute a segment minimum overlapping alternative path for each of the one or more segments. In one embodiment, the routing module 505 can apply any of the MOAP determination processes described above (e.g., process 600 or process 700) on each segment using the distributed constraint parameter (e.g., distributed time constraint) assigned to each segment. In one embodiment, if a MOAP is not found for a segment, the routing module 505 can use the segment itself as its MOAP.

At step 807, the routing module 505 concatenates the computed segment minimum overlapping alternative paths for each segment into a concatenated segment minimum overlapping alternative path. For example, the concatenation includes all of the nodes and links of the computed as the MOAP for each respective segment joined into a continuous path.

At step 809, the routing module 505 determines whether the concatenation satisfies the constraint parameter (e.g., whether the travel time of the concatenation satisfies the specified time constraint δ). If the constraint parameter is satisfied (at step 811), the routing module 505 designates and returns the concatenated segment minimum overlapping alternative path as the minimum overlapping alternative path. Otherwise, the routing module 505 can compute or find a shortest alternative of P (e.g., using the shortest path process discussed above) and take the computed shortest alternative of P as a MOAP if it satisfies the constraint parameter (e.g., the time constraint) (step 813). If this shortest alternative path of P does not satisfy the constrain parameter, then no MOAP exists for the path P.

Figure 9:
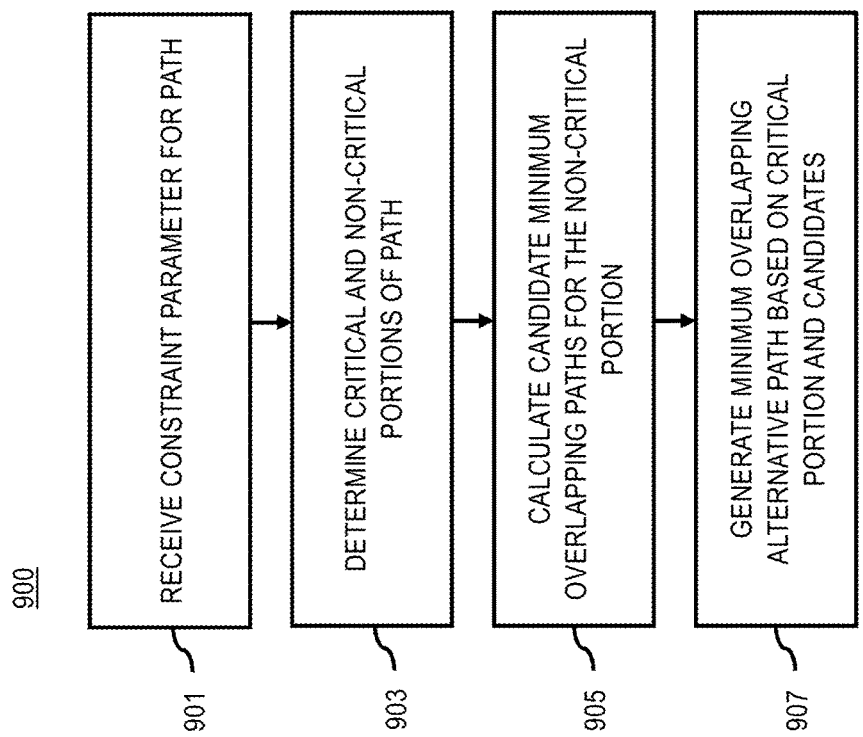
FIG. 9 is a flowchart of a general process for providing a minimum overlapping alternative path, according to one embodiment.

FIG. 9 is a flowchart of a general process for providing a minimum overlapping alternative path, according to one embodiment. In various embodiments, the path computation platform 205 and/or the modules 501-507 of the path computation platform 205 as shown in FIG. 5 may perform one or more portions of the process 900 and may be implemented in, for instance, a chip set including a processor and a memory as shown in FIG. 13. As such, the path computation platform 205 and/or the module 501-507 can provide means for accomplishing various parts of the process 900, as well as means for accomplishing embodiments of other processes described herein in conjunction with other components of the system 200. Although the process 900 is illustrated and described as a sequence of steps, its contemplated that various embodiments of the process 900 may be performed in any order or combination and need not include all of the illustrated steps.

The processes 600-800 of FIGS. 6-8 are discussed with respect to a transportation network that is represented using nodes and links. However, as previously noted, the embodiments described herein are not limited to nodes and links, and are applicable to any type of representation of the transportation network that can be used or stored by the geographic database 207 and/or the system 200. Accordingly, the process 900 describes a MOAP computation that is analogous to the processes described above but without reference to nodes or links. Instead, embodiments of the process 900 are described with respect to "portions" of a path. In one embodiment, "portions" refers to any part of the path less than an entirety of the path. For example, portions can represent individual segments of the path that are divided at selected features of the transportation network (e.g., at intersections, junctions, and/or the like). In addition, "portions" may refer to divided segments of the path. These segments may be divided at regular distances (e.g., every 500 m, 1000 m, etc.) or divided according to any scheme that results in multiple or a plurality of segments of the path or transportation network. In one embodiment, each segment can be represented as a data record of a geographic database (e.g., the geographic database 207), and then combined to reconstruct or represent the geometry of any part of the transportation network it represents.

In step 901, the routing module 505 receives a constraint parameter for traversing a path between a first location and a second location. By way of example and not limitation, the constraint parameters can be a time constraint, distance constraint, fuel-consumption constraint, safety constraint, or a combination thereof. The path can be, for instance, an original or reference path for which a MOAP is to be computed. As noted above, a MOAP computation can be initiated for any number of reasons including, but not limited to: (a) a user request; (b) a request to avoid a detected traffic incident along the original path; (c) a request to provide a non-overlapping return trip that differs as much as possible from the forward path, where the forward path is the original path and the return trip is the MOAP of the original path; (d) a request to provide a new path between a starting point and destination that differs as much as possible from previous trips taken by a user, where the previous trips are the original paths and the new path the MOAP of the previous trips; etc.

In step 903, the link module 501 determines a critical portion of the path, wherein the critical portion is a portion of the path that is to be traveled to satisfy the constraint parameter. In one embodiment, the critical portion is analogous to the critical links described above, such that the critical portion is a portion of the original path that must be included in a MOAP of the original path to meet a constraint parameter. For example, the link module 501 may determine that a first portion of the original path up to a first intersection must be the same as the original path in order to arrive at the destination before a specified time constraint. The link module 501 then designates a remaining portion of the path that is not the critical portion as a non-critical portion. In other words, any part of the original path that is not part of the critical portion represents the non-critical portion.

In step 905, the routing module 505 calculates one or more candidate minimum overlapping alternative paths for the non-critical portion of the path. In one embodiment, the routing module 505 is configured to minimize overlaps in the non-critical portions of the original path and a computed MOAP. To achieve this, the routing module 505 can begin by first computing possible paths with zero or minimal overlap, and then proceed recursively with greater degrees of overlap until a MOAP is found or it is determined that a MOAP does not exist.

More specifically, in one embodiment, the routing module 505 enumerates one or more possible paths for which no portion of a non-critical portion of the one or more possible paths overlaps with the non-critical portion of the path. For example, the routing module 505 can query a geographic database for available paths or path segments or portions between a beginning point of the non-critical portion of the path to the destination point. The routing module 505 then selects the one or more candidate minimum overlapping alternative paths from among the one or more possible paths that satisfy the constraint parameter.

If the routing module 505 determines that none of the one or more possible paths satisfy the constraint parameter, the module 505 then enumerates one or more other possible paths that include an overlapping portion of the non-critical portion of the one or more other possible paths, wherein the overlapping portion overlaps with the non-critical portion of the path. In this case, the routing module 505 can query the geographic database for available paths or path segments or portions between the beginning of the non-overlapping portion of the non-critical area to the destination. This continues recursively until the routing module 505 determines possible paths that satisfy the constraint parameter. For example, the routing module 505 recursively increases the overlapping portion until the constraint parameter is satisfied or until the overlapping portion overlaps entirely with the non-critical portion of the path. The one or more candidate minimum overlapping alternative paths are then selected from among the one or more other possible paths that satisfy the constraint parameter. If overlapping portion overlaps entirely with the non-critical portion of the path, then no MOAP exists.

In one embodiment, the one or more candidate minimum overlapping paths for the non-critical portion are calculated based on an overlapping criterion that is orthogonal to the constraint parameter. In other words, the selection of the constraint parameter and the criterion for determining a degree of overlap can be selected and operate independently of each other. For example, the constraint parameter can be based on travel time, while the overlapping criterion can be based on overlapping lengths of a travel network, overlapping number of links of the travel network, or a combination thereof.

In step 907, the routing module 505 generates the minimum overlapping alternative path between the first location and the second location by combining the critical portion of the path with a selected one of the one or more candidate minimum overlapping alternative paths that satisfies the constraint parameter.

Figure 10:
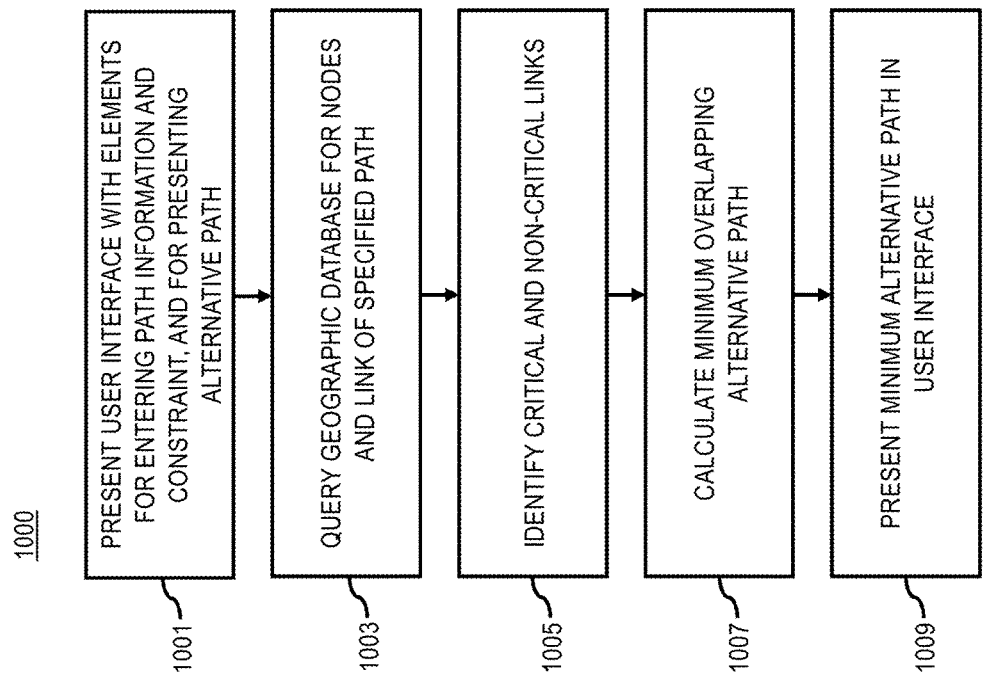
FIG. 10 is a flowchart of a process for presenting user interface for providing a minimum overlapping alternative path, according to one embodiment.

FIG. 10 is a flowchart of a process for presenting user interface for providing a minimum overlapping alternative path, according to one embodiment. In various embodiments, the path computation platform 205 and/or the modules 501-507 of the path computation platform 205 as shown in FIG. 5 may perform one or more portions of the process 1000 and may be implemented in, for instance, a chip set including a processor and a memory as shown in FIG. 13. As such, the path computation platform 205 and/or the module 501-507 can provide means for accomplishing various parts of the process 1000, as well as means for accomplishing embodiments of other processes described herein in conjunction with other components of the system 200. Although the process 1000 is illustrated and described as a sequence of steps, its contemplated that various embodiments of the process 1000 may be performed in any order or combination and need not include all of the illustrated steps.

In the process 1000 of FIG. 10, the path computation platform 205 operates in conjunction with a navigation or mapping system to provide a MOAP as a routing option or server. This process is described with respect to FIGS. 11A-11C which illustrate example user interfaces of a navigation or mapping system capable of providing a MOAP routing option.

In step 1001, the user interface module 507 presents a user interface of the navigation or mapping system. An example of this user interface is illustrated in a user interface 1100 as shown FIG. 11A. In this example, user interface 1100 includes at least three elements related to a MOAP computation: (a) a first element 1101 for entering information (e.g., an origin and/or destination) for a path between a first location (e.g., a current location or origin) and a second location (e.g., a destination), (b) a second element 1103 for entering a constraint parameter for the path, and (c) a third element 1105 for presenting the minimum overlapping alternative path.

In one embodiment, the user interface module 507 can present an option 1107 in the user interface 1100 to specify that a return trip should be calculated. This return trip option 1107 can be used to initiate a MOAP computation according to the various embodiments described herein. For example, user interface 1120 of FIG. 11B illustrates an example where the return trip option 1107 has been selected. In one embodiment, in response to the selection of the option 1107, the user interface module 507 can optionally update the element 1103 from showing an absolute constraint parameter to a relative constraint parameter based on the forward or original path as shown in element 1121 of FIG. 11B. An absolute constraint parameter specifies the constraint parameter without reference to another value. For example, if the constraint parameter is a time constraint, then an example absolute time constraint is "1 hour" as shown in element 1103 of FIG. 11A. In contrast, a relative constraint parameter can specify a constraint relative to another value. For example, as shown in FIG. 11B, the relative constraint parameter specifies "within 15 minutes of forward trip." Accordingly, when calculating a MOAP in this scenario, the path computation platform 205 can determine the time constraint of the forward or original path and add the specified relative amount (e.g., 15 minutes to the travel time of the forward path in this example).

In one embodiment, the user interface module 507 can also present an option in the user interface to initiate the calculating of the minimum overlapping alternative path in response to a detected traffic incident. User interface 1140 of FIG. 11C illustrates an example of an alert message 1141 regarding a detected traffic incident. In one embodiment, the path computation platform 205 can initiate a MOAP computation automatically and indicate such as computation has been initiated. For example, the alert message 1141 of FIG. 11C states "Rerouting with minimum overlap" to indicate to a user that the path computation platform 105 is calculating a MOAP to the currently active route. Alternatively, the alert message 1141 can present a manual option to the user to initiate a MOAP computation.

In one embodiment, the path computation platform 205 can use any of the MOAP computation processes according to the embodiments of FIGS. 6-10. For example, in summary, to initiate a MOAP computation, in step 1003, the link module 501 queries a geographic database for a set of nodes and links that delineate the path between a first location and a second location. This query, for instance, can be initiated in response to a user interaction for entering the information for the path and the constraint parameter via the user interface (e.g., in manual operation) or automatically (e.g., automatically rerouting around a detected traffic incident or accident).

In step 1005, the link module 501 identifies one or more critical links of the path, wherein the one or more critical links are to be traveled between the first location and the second location to satisfy a constraint parameter. The link module 501 also identifies the links of the set that are not the one or more critical links as non-critical links, as previously described.

In step 1007, the routing module 505 calculates the minimum overlapping alternative path that includes the one or more critical links, minimizes a number of the non-critical links that overlap between the minimum overlapping alternative path and the path, and satisfies the constraint parameter.

Figure 11A:
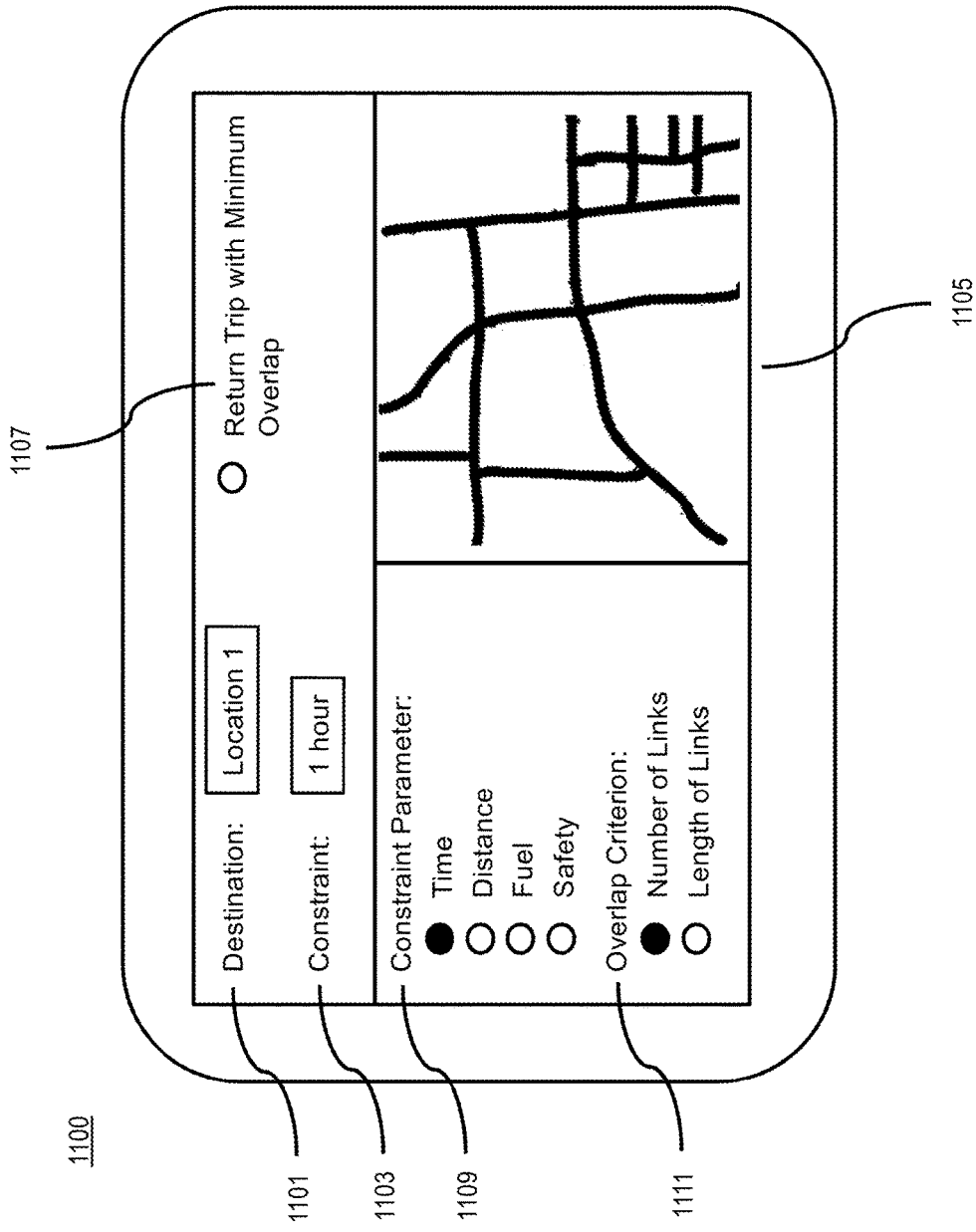
FIGS. 11A-11C are diagrams of user interfaces of a navigation or mapping system configured to provide a minimum overlapping alternative path, according to one embodiment.
Figure 11B:
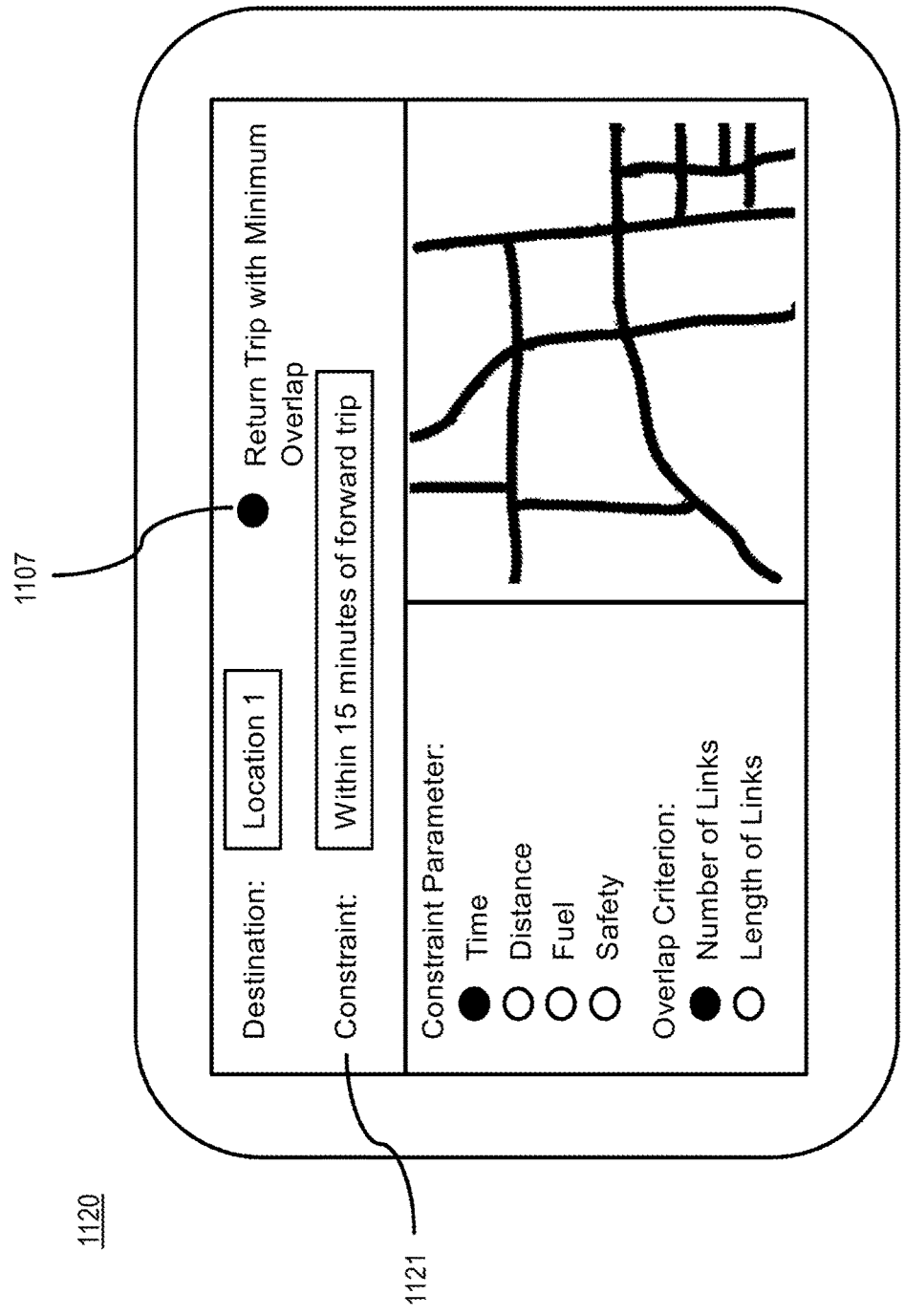
Figure 11C:
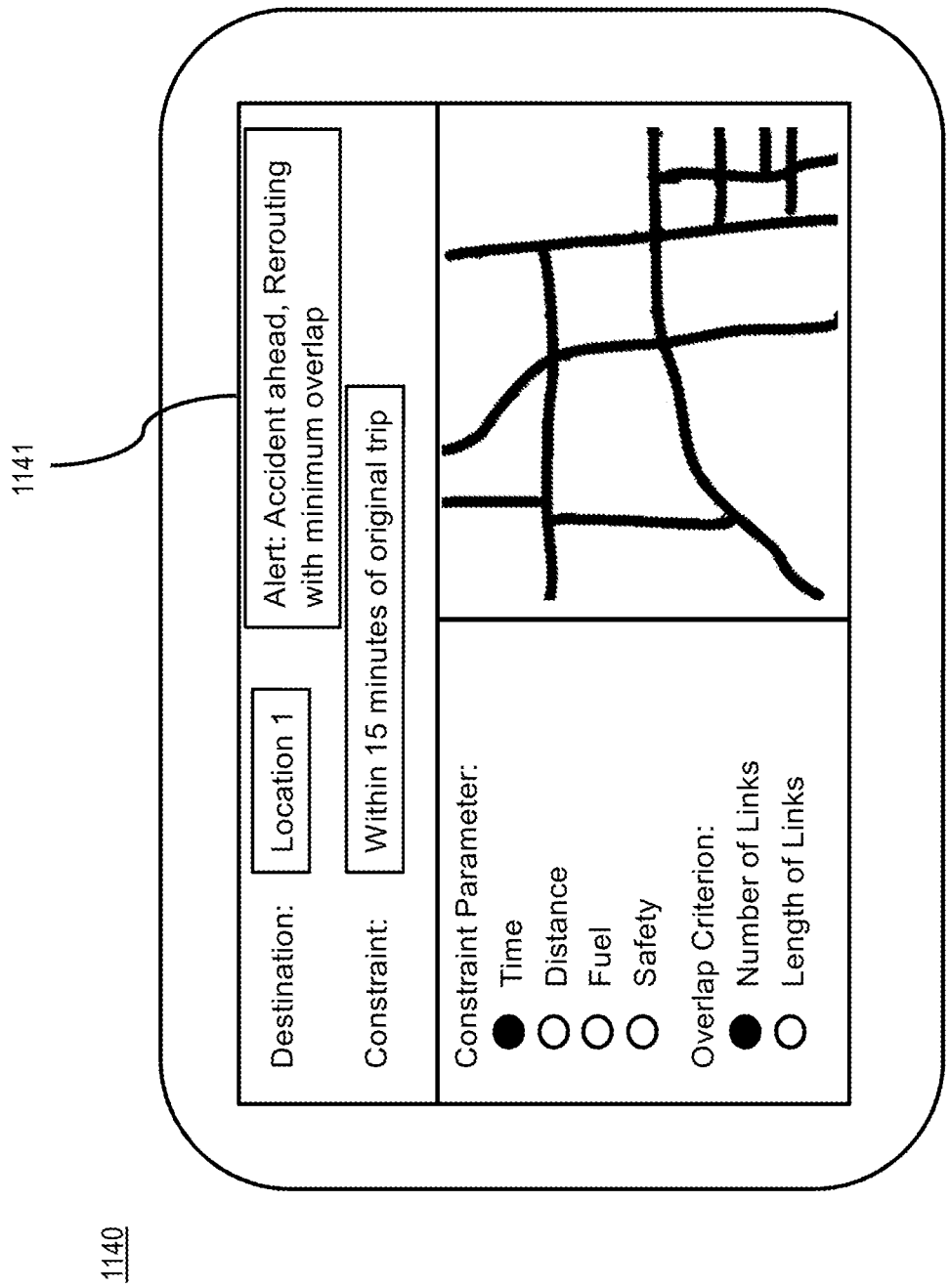

In step 1009, the user interface module 507 presents the minimum overlapping alternative path in the user interface (e.g., element 1105 of FIG. 11A).

In one embodiment, the user interface 1100 can also provide additional elements for configuring a MOAP computation. For example, as shown in FIG. 11A, the user interface module 507 can provide an option 1109 to select the type of constraint parameter to use. In this example, the different types of constraint parameters include, but are not limited to: travel time, distance, fuel consumption, and safety. As shown, the time constraint is selected in element 1109, and therefore, the constraint element 1103 is indicated as a time constraint. In one embodiment, the user interface module 507 can also present an element 1111 for specifying a type of overlap criterion. The types includes, but are not limited to number of links and length of links. By way of example, number of links determines overlaps by counting number of links overlap between an original path and its MOAP regardless of the individual lengths of the links. On the other hand, the length of links computes respective lengths of each (e.g., from the geographic database 207) to determine how much or what percentage of the distance of the path constitute the overlapping links of the original path and its MOAP.

The processes described herein for providing a minimum overlapping alternative path may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 12:
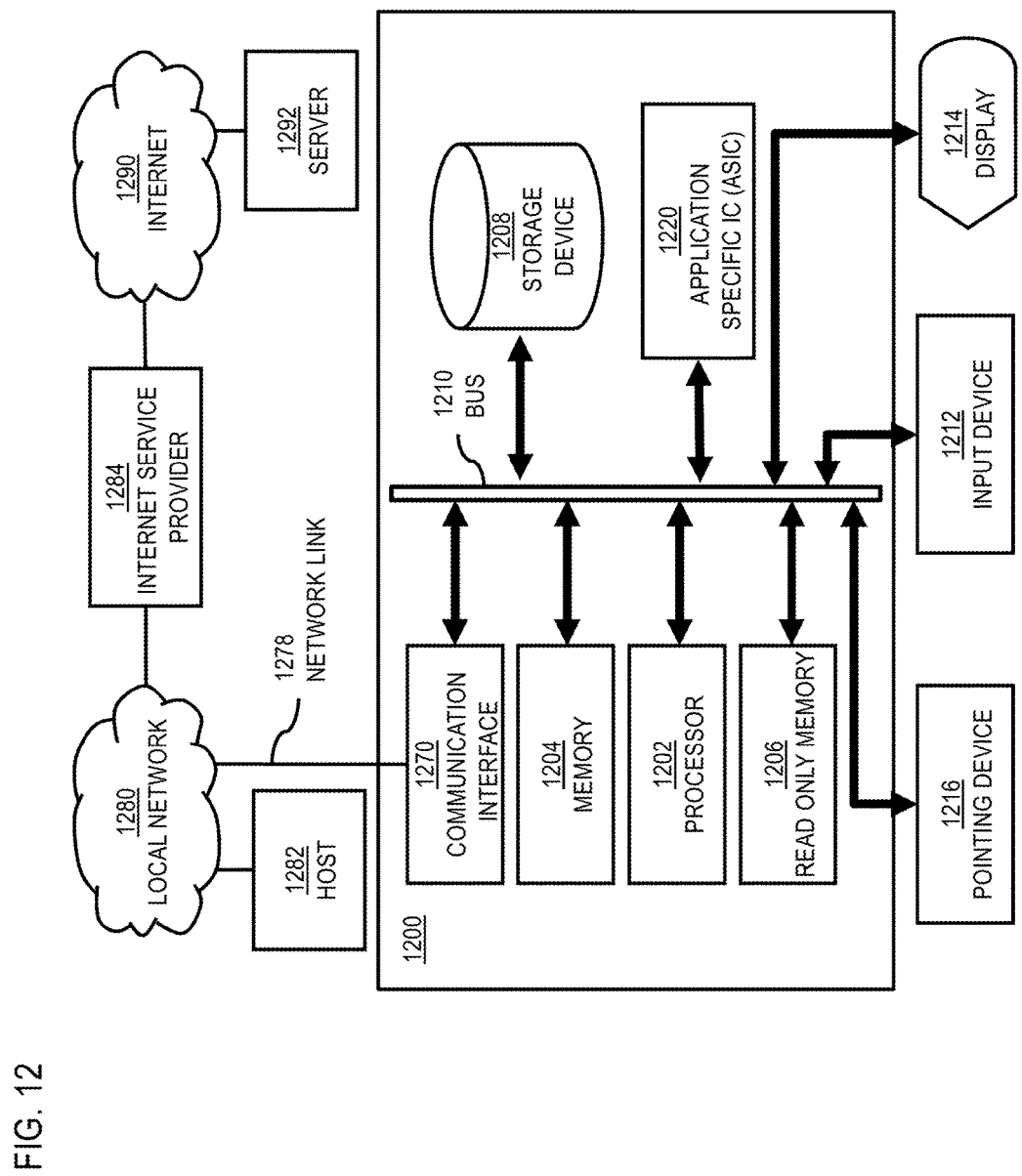
FIG. 12 is a diagram of hardware that can be used to implement an embodiment.

FIG. 12 illustrates a computer system 1200 upon which an embodiment of the invention may be implemented. Computer system 1200 is programmed (e.g., via computer program code or instructions) to provide a minimum overlapping alternative path as described herein and includes a communication mechanism such as a bus 1210 for passing information between other internal and external components of the computer system 1200. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1210 includes one or more parallel conductors of information so that information is transferred quickly among devices coupled to the bus 1210. One or more processors 1202 for processing information are coupled with the bus 1210.

A processor 1202 performs a set of operations on information as specified by computer program code related to providing a minimum overlapping alternative path. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1210 and placing information on the bus 1210. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1202, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1200 also includes a memory 1204 coupled to bus 1210. The memory 1204, such as a random access memory (RAM) or other dynamic storage device, stores information including processor instructions for providing a minimum overlapping alternative path. Dynamic memory allows information stored therein to be changed by the computer system 1200. RAM allows a unit of information stored at a location called a memory address to be stored and retrieved independently of information at neighboring addresses. The memory 1204 is also used by the processor 1202 to store temporary values during execution of processor instructions. The computer system 1200 also includes a read only memory (ROM) 1206 or other static storage device coupled to the bus 1210 for storing static information, including instructions, that is not changed by the computer system 1200. Some memory is composed of volatile storage that loses the information stored thereon when power is lost. Also coupled to bus 1210 is a non-volatile (persistent) storage device 1208, such as a magnetic disk, optical disk or flash card, for storing information, including instructions, that persists even when the computer system 1200 is turned off or otherwise loses power.

Information, including instructions for providing a minimum overlapping alternative path, is provided to the bus 1210 for use by the processor from an external input device 1212, such as a keyboard containing alphanumeric keys operated by a human user, or a sensor. A sensor detects conditions in its vicinity and transforms those detections into physical expression compatible with the measurable phenomenon used to represent information in computer system 1200. Other external devices coupled to bus 1210, used primarily for interacting with humans, include a display device 1214, such as a cathode ray tube (CRT) or a liquid crystal display (LCD), or plasma screen or printer for presenting text or images, and a pointing device 1216, such as a mouse or a trackball or cursor direction keys, or motion sensor, for controlling a position of a small cursor image presented on the display 1214 and issuing commands associated with graphical elements presented on the display 1214. In some embodiments, for example, in embodiments in which the computer system 1200 performs all functions automatically without human input, one or more of external input device 1212, display device 1214 and pointing device 1216 is omitted.

In the illustrated embodiment, special purpose hardware, such as an application specific integrated circuit (ASIC) 1220, is coupled to bus 1210. The special purpose hardware is configured to perform operations not performed by processor 1202 quickly enough for special purposes. Examples of application specific ICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210. Communication interface 1270 provides a one-way or two-way communication coupling to a variety of external devices that operate with their own processors, such as printers, scanners and external disks. In general the coupling is with a network link 1278 that is connected to a local network 1280 to which a variety of external devices with their own processors are connected. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. For wireless links, the communications interface 1270 sends or receives or both sends and receives electrical, acoustic or electromagnetic signals, including infrared and optical signals, that carry information streams, such as digital data. For example, in wireless handheld devices, such as mobile telephones like cell phones, the communications interface 1270 includes a radio band electromagnetic transmitter and receiver called a radio transceiver. In certain embodiments, the communications interface 1270 enables connection to the communication network 209 for providing a minimum overlapping alternative path.

The term computer-readable medium is used herein to refer to any medium that participates in providing information to processor 1202, including instructions for execution. Such a medium may take many forms, including, but not limited to, non-volatile media, volatile media and transmission media. Non-volatile media include, for example, optical or magnetic disks, such as storage device 1208. Volatile media include, for example, dynamic memory 1204. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 13 illustrates a chip set 1300 upon which an embodiment of the invention may be implemented. Chip set 1300 is programmed to provide a minimum overlapping alternative path as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform the inventive steps described herein to provide a minimum overlapping alternative path. The memory 1305 also stores the data associated with or generated by the execution of the inventive steps.

Figure 14:
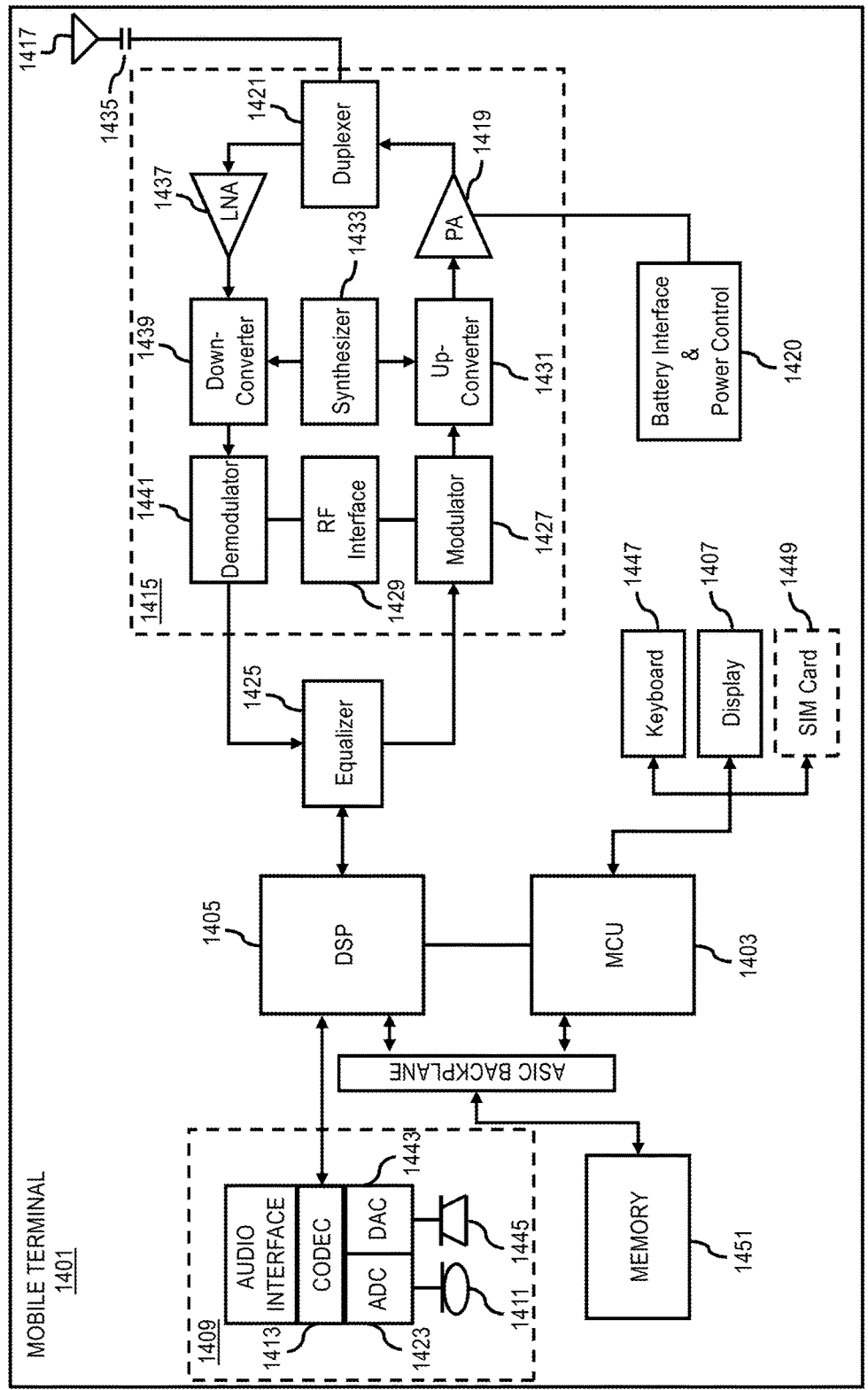
FIG. 14 is a diagram of a mobile terminal (e.g., mobile computer) that can be used to implement an embodiment.

FIG. 14 is a diagram of exemplary components of a mobile station 1401 (e.g., mobile device or vehicle like UE 201 and/or vehicle 203) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1403, a Digital Signal Processor (DSP) 1405, and a receiver/transmitter unit including a microphone gain control unit and a speaker gain control unit. A main display unit 1407 provides a display to the user in support of various applications and mobile station functions that offer automatic contact matching. An audio function circuitry 1409 includes a microphone 1411 and microphone amplifier that amplifies the speech signal output from the microphone 1411. The amplified speech signal output from the microphone 1411 is fed to a coder/decoder (CODEC) 1413.

A radio section 1415 amplifies power and converts frequency in order to communicate with a base station, which is included in a mobile communication system, via antenna 1417. The power amplifier (PA) 1419 and the transmitter/modulation circuitry are operationally responsive to the MCU 1403, with an output from the PA 1419 coupled to the duplexer 1421 or circulator or antenna switch, as known in the art. The PA 1419 also couples to a battery interface and power control unit 1420.

In use, a user of mobile station 1401 speaks into the microphone 1411 and his or her voice along with any detected background noise is converted into an analog voltage. The analog voltage is then converted into a digital signal through the Analog to Digital Converter (ADC) 1423. The control unit 1403 routes the digital signal into the DSP 1405 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1425 for compensation of any frequency-dependent impairments that occur during transmission though the air such as phase and amplitude distortion. After equalizing the bit stream, the modulator 1427 combines the signal with a RF signal generated in the RF interface 1429. The modulator 1427 generates a sine wave by way of frequency or phase modulation. In order to prepare the signal for transmission, an up-converter 1431 combines the sine wave output from the modulator 1427 with another sine wave generated by a synthesizer 1433 to achieve the desired frequency of transmission. The signal is then sent through a PA 1419 to increase the signal to an appropriate power level. In practical systems, the PA 1419 acts as a variable gain amplifier whose gain is controlled by the DSP 1405 from information received from a network base station. The signal is then filtered within the duplexer 1421 and optionally sent to an antenna coupler 1435 to match impedances to provide maximum power transfer. Finally, the signal is transmitted via antenna 1417 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1401 are received via antenna 1417 and immediately amplified by a low noise amplifier (LNA) 1437. A down-converter 1439 lowers the carrier frequency while the demodulator 1441 strips away the RF leaving only a digital bit stream. The signal then goes through the equalizer 1425 and is processed by the DSP 1405. A Digital to Analog Converter (DAC) 1443 converts the signal and the resulting output is transmitted to the user through the speaker 1445, all under control of a Main Control Unit (MCU) 1403—which can be implemented as a Central Processing Unit (CPU) (not shown).

The MCU 1403 receives various signals including input signals from the keyboard 1447. The keyboard 1447 and/or the MCU 1403 in combination with other user input components (e.g., the microphone 1411) comprise a user interface circuitry for managing user input. The MCU 1403 runs a user interface software to facilitate user control of at least some functions of the mobile station 1401 to provide a minimum overlapping alternative path. The MCU 1403 also delivers a display command and a switch command to the display 1407 and to the speech output switching controller, respectively. Further, the MCU 1403 exchanges information with the DSP 1405 and can access an optionally incorporated SIM card 1449 and a memory 1451. In addition, the MCU 1403 executes various control functions required of the station. The DSP 1405 may, depending upon the implementation, perform any of a variety of conventional digital processing functions on the voice signals. Additionally, DSP 1405 determines the background noise level of the local environment from the signals detected by microphone 1411 and sets the gain of microphone 1411 to a level selected to compensate for the natural tendency of the user of the mobile station 1401.

The CODEC 1413 includes the ADC 1423 and DAC 1443. The memory 1451 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1451 may be, but not limited to, a single memory, CD, DVD, ROM, RAM, EEPROM, optical storage, or any other non-volatile or non-transitory storage medium capable of storing digital data.

An optionally incorporated SIM card 1449 carries, for instance, important information, such as the cellular phone number, the carrier supplying service, subscription details, and security information. The SIM card 1449 serves primarily to identify the mobile station 1401 on a radio network. The card 1449 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for determining a minimum overlapping alternative path in a navigation or mapping system comprising:
   receiving a constraint parameter for traversing a path between a first location and a second location;
   determining a critical portion of the path, wherein the critical portion is a portion of the path that is to be traveled to satisfy the constraint parameter;
   designating a remaining portion of the path that is not the critical portion as a non-critical portion;

calculating one or more candidate minimum overlapping alternative paths for the non-critical portion of the path; and generating the minimum overlapping alternative path between the first location and the second location by combining the critical portion of the path with a selected one of the one or more candidate minimum overlapping alternative paths that satisfy the constraint parameter.

2. The method of claim 1, wherein the calculating of the one or more candidate minimum overlapping alternative paths for the non-critical portion of the path comprises:

enumerating one or more possible paths for which no portion of a non-critical portion of the one or more possible paths overlaps with the non-critical portion of the path; and selecting the one or more candidate minimum overlapping alternative paths from among the one or more possible paths that satisfy the constraint parameter.

3. The method of claim 2, further comprising:

determining that none of the one or more possible paths satisfy the constraint parameter; and enumerating one or more other possible paths that include an overlapping portion of the non-critical portion of the one or more other possible paths, wherein the overlapping portion overlaps with the non-critical portion of the path; and selecting the one or more candidate minimum overlapping alternative paths from among the one or more other possible paths that satisfy the constraint parameter.

4. The method of claim 3, further comprising:

recursively increasing the overlapping portion until the constraint parameter is satisfied or until the overlapping portion overlaps entirely with the non-critical portion of the path.

5. The method of claim 1, wherein the constraint parameter is a time constraint, distance constraint, fuel-consumption constraint, safety constraint, or a combination thereof.

6. The method of claim 1, wherein the one or more candidate minimum overlapping paths for the non-critical portion are calculated based on an overlapping criterion that is orthogonal to the constraint parameter.

7. The method of claim 6, wherein the overlapping criterion is based on overlapping lengths of a travel network, overlapping links of the travel network, or a combination thereof.

8. An apparatus for determining a minimum overlapping alternative path in a navigation or mapping system comprising:

at least one processor; and at least one memory including computer program code for one or more programs, the at least one memory and the computer program code configured to, with the at least one processor, cause the apparatus to perform at least the following, determine a set of nodes and links of a geographic database that delineate a path between a first location and a second location;

identify one or more critical links of the path, wherein the one or more critical links are to be traveled between the first location and the second location to satisfy a constraint parameter;

identify the links of the set that are not the one or more critical links as non-critical links; and calculate a minimum overlapping alternative path that includes the one or more critical links, minimizes a number of the non-critical links that overlap between the minimum overlapping alternative path and the path, and satisfies the constraint parameter.

9. The apparatus of claim 8, wherein the minimum overlapping alternative path is a return trip of the path between the first location and the second location.

10. The apparatus of claim 8, wherein the apparatus is further caused to:

detect a traffic incident along the path; and initiate the calculating of the minimum overlapping alternative path in response to the detected traffic incident.

11. The apparatus of claim 8, wherein the apparatus is further caused to:

combine two adjacent links of the set of links into one or more super links when the two adjacent links include bivalent nodes, wherein the one or more super links replace the two adjacent links in the determining of the one or more critical links, the one or more non-critical links, or a combination thereof.

12. The apparatus of claim 8, wherein the apparatus is further caused to:

construct a powerset of the one or more non-critical links, wherein an element of the powerset that corresponds to the path is removed from the powerset;

sort the powerset according to a sorting criterion;

in ascending order of the sorted powerset, compute a shortest path spanning a first node and last node included in each element of the sorted powerset until the computed shortest path satisfies the constraint parameter; and designate the resulting computed shortest path as the minimum overlapping alternative path.

13. The apparatus of claim 8, wherein the apparatus is further caused to:

construct a powerset of the one or more non-critical links, wherein an element of the powerset that corresponds to the path is removed from the powerset;

sort the powerset according to a sorting criterion;

group each element of the sorted powerset into one or more groups according to a degree of link overlap between the one or more non-critical links of the path;

select a representative element from each of the one or more groups; and in ascending order of the sorted powerset, compute a shortest path spanning a first node and last node included in each of the selected representative elements until the computed shortest path satisfies the constraint parameter; and designate the resulting computed shortest path as the minimum overlapping alternative path.

14. The apparatus of claim 8, wherein the apparatus is further caused to:

determine a maximum number of links of the path to be processed by a computing device;

divide the path into one or more segments based on the maximum number of links;

distribute the constraint parameter in proportion to the one or more segments;

compute a segment minimum overlapping alternative path for each of the one or more segments;

concatenate the computed segment minimum overlapping alternative paths into a concatenated segment minimum overlapping alternative path; and designate the concatenated segment minimum overlapping alternative path as the minimum overlapping alternative path if the concatenated segment minimum overlapping alternative path satisfies the constraint parameter.

15. A non-transitory computer-readable storage medium determining a minimum overlapping alternative path in a navigation or mapping system, carrying one or more sequences of one or more instructions which, when executed by one or more processors, cause an apparatus to at least perform the following steps:
- presenting a user interface of the navigation or mapping system, wherein the user interface includes a first element for entering information for a path between a first location and a second location, a second element for entering a constraint parameter for the path, and a third element for presenting the minimum overlapping alternative path;
- in response to a user interaction for entering the information for the path and the constraint parameter via the user interface, querying a geographic database for a set of nodes and links that delineate the path between a first location and a second location;
- identifying one or more critical links of the path, wherein the one or more critical links are to be traveled between the first location and the second location to satisfy a constraint parameter;
- identifying the links of the set that are not the one or more critical links as non-critical links;
- calculating the minimum overlapping alternative path that includes the one or more critical links, minimizes a number of the non-critical links that overlap between the minimum overlapping alternative path and the path, and satisfies the constraint parameter; and
- presenting the minimum overlapping alternative path in the user interface.

16. The non-transitory computer-readable storage medium of claim 15, wherein the user interface includes a fourth element for requesting a return trip for the path, and wherein the minimum overlapping alternative path is calculated as the return trip.

17. The non-transitory computer-readable storage medium of claim 15, wherein the apparatus is further caused to perform:
- presenting an option in the user interface to initiate the calculating of the minimum overlapping alternative path in response to a detected traffic incident.

18. The non-transitory computer-readable storage medium of claim 15, wherein the apparatus is further caused to perform:
- constructing a powerset of the one or more non-critical links, wherein an element of the powerset that corresponds to the path is removed from the powerset;
- sorting the powerset according to a sorting criterion;
- in ascending order of the sorted powerset, computing a shortest path spanning a first node and last node included in each element of the sorted powerset until the computed shortest path satisfies the constraint parameter; and
- designating the resulting computed shortest path as the minimum overlapping alternative path.

19. The non-transitory computer-readable storage medium of claim 15, wherein the apparatus is further caused to perform:
- constructing a powerset of the one or more non-critical links, wherein an element of the powerset that corresponds to the path is removed from the powerset;
- sorting the powerset according to a sorting criterion;
- grouping each element of the sorted powerset into one or more groups according to a degree of link overlap between the one or more non-critical links of the path;
- selecting a representative element from each of the one or more groups; and
- in ascending order of the sorted powerset, computing a shortest path spanning a first node and last node included in each of the selected representative elements until the computed shortest path satisfies the constraint parameter; and
- designating the resulting computed shortest path as the minimum overlapping alternative path.

20. The non-transitory computer-readable storage medium of claim 15, wherein the apparatus is further caused to perform:
- determining a maximum number of links of the path to be processed by a computing device;
- dividing the path into one or more segments based on the maximum number of links;
- distributing the constraint parameter in proportion to the one or more segments;
- computing a segment minimum overlapping alternative path for each of the one or more segments;
- concatenating the computed segment minimum overlapping alternative paths into a concatenated segment minimum overlapping alternative path; and
- designating the concatenated segment minimum overlapping alternative path as the minimum overlapping alternative path if the concatenated segment minimum overlapping alternative path satisfies the constraint parameter.

* * * * *